US008462742B2

(12) United States Patent
Song et al.

(10) Patent No.: US 8,462,742 B2
(45) Date of Patent: Jun. 11, 2013

(54) SYSTEM AND METHOD FOR OPTIMIZING AUTHENTICATION PROCEDURE DURING INTER ACCESS SYSTEM HANDOVERS

(75) Inventors: O-Sok Song, Suwon-si (KR); Rajavelsamy Rajadurai, Bangalore (IN); Jedigunta Venkateshwar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1058 days.

(21) Appl. No.: 11/732,202

(22) Filed: Apr. 2, 2007

(65) Prior Publication Data
US 2007/0249352 A1    Oct. 25, 2007

(30) Foreign Application Priority Data
Mar. 31, 2006  (IN) .............................. 597/CHE/2006

(51) Int. Cl.
*H04W 4/00*        (2009.01)
*H04W 36/00*       (2009.01)
(52) U.S. Cl.
USPC ............ 370/338; 455/439; 455/444; 455/411
(58) Field of Classification Search
USPC .................................................. 455/439, 444
See application file for complete search history.

(56) References Cited

U.S. PATENT DOCUMENTS

| 6,611,547 | B1 * | 8/2003 | Rauhala ........................ 370/331 |
| 6,744,753 | B2 * | 6/2004 | Heinonen et al. ............. 370/338 |
| 2004/0067754 | A1 | 4/2004 | Gao et al. |
| 2004/0090937 | A1 * | 5/2004 | Chaskar et al. ............... 370/331 |
| 2004/0179502 | A1 * | 9/2004 | Naghian et al. ............... 370/338 |
| 2004/0236939 | A1 * | 11/2004 | Watanabe et al. ............. 713/150 |

FOREIGN PATENT DOCUMENTS

| KR | 1020060023359 | 3/2006 |
| WO | WO 02/43348 | 5/2002 |
| WO | WO 2005/027557 | 3/2005 |
| WO | WO 2005/027560 | 3/2005 |
| WO | WO 2005/076649 | 8/2005 |
| WO | WO 2005076564 A1 * | 8/2005 |

OTHER PUBLICATIONS

Hyeyeon Kwon et al., "Consideration of UMTS-WLAN Seamless Handover", Proceedings of the Seventh IEEE International Symposium on Multimedia (ISM'05), Dec. 2005.

* cited by examiner

*Primary Examiner* — Rafael Pérez-Gutiérrez
*Assistant Examiner* — Joshua Schwartz
(74) *Attorney, Agent, or Firm* — The Farrell Law Firm, P.C.

(57) ABSTRACT

Disclosed is a method and system of deriving new keys for accessing a new system. The method enables an optimized authentication procedure during handover form an existing system to a new system by using the existing system access keys. The user equipment that is accessing the new system receives a temporary ID during handover preparation which enables the user equipment to perform a fast re-authentication. The method uses existing system access keys to derive system access keys for the new network.

21 Claims, 14 Drawing Sheets

SYSTEM AND METHOD FOR OPTIMIZING AUTHENTICATION PROCEDURE DURING INTER ACCESS SYSTEM HANDOVERS

PRIORITY

This application claims priority to an application entitled "A System and Method for Optimizing Authentication Procedure During Inter Access System Handovers", filed in the Indian Intellectual Property Office on Mar. 31, 2006 and assigned serial number 597/CHE/2006, the contents of which are incorporated herein by reference.

BACKGROUND OF THE INVENTION

1. Field of the Invention

The present invention relates generally to the field of Heterogeneous systems, optimization of the authentication procedure during Inter access system handovers, and a method of key derivation for the evolved system. More particularly, this invention provides a method of deriving new keys for securing communication with the new access system after handover using the previous access system keys.

2. Description of the Related Art

The Radio Access Network (RAN), System Architecture (SA) and the Core Terminal (CT) working groups of the Third Generation Partnership Project (3GPP) aim to develop an Enhanced UTRAN (E-UTRAN) architecture for next generation wireless systems. The E-UTRAN system is required to co-exist with the Second (2G) and Third Generation (3G) wireless systems, and in particular, to support handovers between the existing systems and the newly evolved E-UTRAN system, specified in the 3GPP TR 23.882, 3GPP TS 23.401 and 3GPP TS 23.402 specifications.

The E-UTRAN system is an evolution of the 3GPP UTRAN system, in which the main entities are the User Equipment (UE), the Enhanced Node B (ENB), Mobility Management Entity (MME), User Plane Entity (UPE) and Inter Access System Anchor (IASA) as shown in the FIG. 1. The ENB of the EUTRAN system should have the features of the Node B and the Radio Network Controller (RNC) of the legacy UTRAN system. MME of the System Architecture Evolution (SAE) manages and stores UE context (for idle state: UE/user identities, UE mobility state, user security parameters). The MME also generates temporary identities that it allocates to UEs, checks the authorization as to whether the UE may camp on the TA or on the PLMN (Public Land Mobile Network), and authenticates the user. The UPE of SAE terminates for idle state UEs the downlink data path and triggers/initiates paging when downlink data arrive for the UE. The UPE also manages and stores UE contexts, e.g. parameters of the Internet Protocol (IP) bearer service or network internal routing information, and performs replication of the user traffic in case of interception. IASA is the user plane anchor for mobility between different access systems. It performs or supports handover between different access systems.

The Global System for Mobile Communication (GSM)/Enhanced Data rates for Global Evolution (EDGE) Radio Access Network (GERAN) consists of the Base Transceiver Station (BTS) and the Base Station Controller (BSC). The UTRAN consists of the Node B and the Radio Network Controller (RNC). The General Packet Radio Service (GPRS) Core Network consists of the Serving GPRS Support Node (SGSN) and the Gateway GPRS Support Node (GGSN) as shown in FIG. 1

The Integrated Wireless Local Area Network (I-WLAN) system specified in the 3GPP TS 23.234 specifications provides a system and method to integrate legacy UTRAN systems with WLAN systems, as shown in FIG. 2. The I-WLAN system allows WLAN users to access 3GPP packet switched services.

Currently, however, there is no efficient mechanism specified to provide authentication procedure during handover between the heterogeneous access systems. Also, there is no method described to generate keys for the evolved system.

SUMMARY OF THE INVENTION

An aspect of the present invention is to address at least the above problems and/or disadvantages and to provide at least the advantages described below. Accordingly, an aspect of the present invention is to provide a method for optimizing an authentication procedure during inter access system handovers in heterogeneous networks. The method includes deriving new keys for accessing the new system, enabling an optimized authentication procedure during handover from an existing system to a new system by using the existing system access keys, and receiving a temporary Identification (ID) by a UE that is accessing the new system during handover preparation, which enables the UE to quickly perform re-authentication.

Another aspect of the present invention is to provide a system for optimizing authentication procedure during inter access system handovers in heterogeneous networks. The system includes means for deriving new keys for accessing the new system, means for enabling an optimized authentication procedure during handover from an existing system to a new system by using the existing system access keys, and means for receiving a temporary ID by a UE that is accessing the new system during handover preparation, which enables the UE to quickly perform re-authentication.

The present invention includes mechanisms that provide optimized authentication procedure during handover by utilizing the active authentication key in a first access system to be used in a second access system. This invention also includes a mechanism to quickly perform a re-authentication during a handover procedure.

The present invention further includes mechanisms to derive keys for the evolved system to secure the communication between the UE and the network entities.

Moreover, the aspects of the present invention are as follows:

To optimize the network access authentication procedure during handover in a heterogeneous network environment;

to provide a mechanism to derive new keys for the new access system without performing an access system dependent authentication procedure, but instead by using the latest active keys derived in the previous access system;

to provide a mechanism to derive new keys for both a forward handover and a backward handover;

to provide signaling interface between the MME/UPE and the Authentication Authorization and Accounting (AAA) server to exchange keys, security context and other messages therebetween through the logical interworking unit, which is co-located with the network entity in the SAE system or in the I-WLAN interworking system or a separate entity in the SAE system or in the I-WLAN interworking system;

to derive keys using the active EUTRAN network access keys by the UE and the AAA server for I-WLAN access and secure communication;

to derive the keys (EAP related keys, namely TEK, MSK and EMSK) using the latest Cypher Key (CK) and Integrity Key (IK) during the handover preparation phase from the SAE system or from the UMTS system to the I-WLAN system. The UE will send the I-WLAN identity and NAI in the measurement report to the SAE system. The network entity in the SAE system includes the latest CK and IK with other parameters within the HandOver (HO) preparation request sent to the I-WLAN interworking system. The UE and the network can derive the keys during the handover preparation phase;

to provide that during the I-WLAN attach procedure, when the UE moves from the SAE system to the I-WLAN system, the I-WLAN network entity (AAA server) sends the MSK to the WLAN-AN without EAP authentication procedure, when the WLAN-AN requests for authentication of the UE to the AAA server, if the UE and the AAA server derive the keys during the handover preparation phase. In this manner, the UE and the I-WLAN AS can directly perform the Institute of Electrical and Electronic Engineers (I.E.E.E.) 802.11 specific handshake mechanism and begin Layer 2 protections; and to send the I-WLAN specific temporary-IDs pseudonym and/or fast re-authentication ID, by the AAA server (within the HO accept message/HO command message) to the UE during handover preparation phase. The UE can perform the Fast re-authentication procedure initially when handing over from the SAE AS to the I-WLAN AS (if the network sends the fast re-authentication ID and requests the UE to authenticate and refresh the keys). According to the present invention, the UE can send the sequence number of the last successfully received packet to the I-WLAN AS. I-WLAN AS, can forward the same to the core network, which in turn can start forwarding to the UE the packets after the last successful received sequence number.

According to the present invention, the network can indicate to the UE to perform both the scenario-2 and scenario-3 authentication procedure and also the list of supported optimization procedures to the UE during the HO command while handing over from the SAE system or from the UMTS system to the I-WLAN system. In this manner, the UE can select and begin one of the optimization procedures supported by the network directly without any trial and error method.

According to the present invention, the MME performs a soft registration in the HSS during the HO preparation phase, so that after handover the UE attaches with the same MME. The SGSN performs a soft registration in the HSS during the HO preparation phase, so that after handover the UE attaches with the same SGSN.

According to the present invention, the AAA server does a soft registration in the HSS during the HO preparation phase, so that after handover the UE attaches with the same AAA server. The secure mode command procedure is done during the HO preparation phase while handing over to SAE system or to UMTS system.

According to the present invention, the UE sends the selected algorithm from the list of network-supported algorithms broadcasted by the network in the measurement report to the SAE system. In the HO command, the SAE system can agree/negotiate with the UE selected algorithm, so that the UE can start protecting the initial message during handover.

According to the present invention, the SGSN passes the latest CK and IK to the MME or authentication and key management entity of the SAE system, derive the SAE specific keys and distribute the keys to the SAE system entities before or during handover.

According to the present invention, the MME converts the LTE (Lon Term Evolution) related parameters to UMTS specific parameters, during the HO request from the other AS and vise versa. The MME passes the latest CK and IK to the SGSN, which distributes the keys to the Radio Network Controller (RNC) during handover preparation request from the SAE system.

According to the present invention, during the forward handover authentication procedure for the UMTS AS, the UE sends the details of the previous access system within the RAU procedure or initial NAS message and the core network can retrieve the security context (e.g., CK and IK) and the buffered packets from the previous access system. During the forward handover authentication procedure to the I-WLAN AS, the UE sends the details of the previous access system, such that the core network can retrieve the security context and the buffered packets from the previous access system. The details of the previous access system are sent within the EAPOL ID response messages.

According to the present invention, the UE sends the sequence number of the last successfully received packet to the access system, which forwards the same to the previous core network so that it may start forwarding the packets after the last successful sequence number received by the UE.

According to the present invention, during the scenario-2 authentication procedure in the I-WLAN AS, if the UE and the network derive the keys using UMTS CK and IK, then core network generates the temporary ID and pass it to the UE. The UE begins a fast re-authentication procedure for scenario-3 access. During the forward handover authentication procedure for the SAE AS, the UE sends the details of the previous access system within the TAU procedure or initial NAS message, so that core network can retrieve the security context (e.g., CK and IK) and the buffered packets from the previous access system.

In addition, the present invention provides mechanisms to derive the SAE system specific keys.

BRIEF DESCRIPTION OF THE DRAWINGS

The above and other objects, features and advantages of the present invention will become more apparent from the ensuing detailed description of the invention taken in conjunction with the accompanying drawings, in which.

DETAILED DESCRIPTION OF THE PREFERRED EMBODIMENTS

The preferred embodiments of the present invention will now be explained with reference to the accompanying drawings. It should be understood however that the disclosed embodiments are merely preferred, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described herein for the sake of clarity and conciseness.

The present invention provides a system and method for providing an optimized authentication procedure during handover between the heterogeneous networks, and also for providing the mechanism to derive the SAE system specific keys.

The method herein includes mechanisms to derive the new access system specific keys by using the previous access system keys without performing the access system specific authentication procedure.

Figure 1:
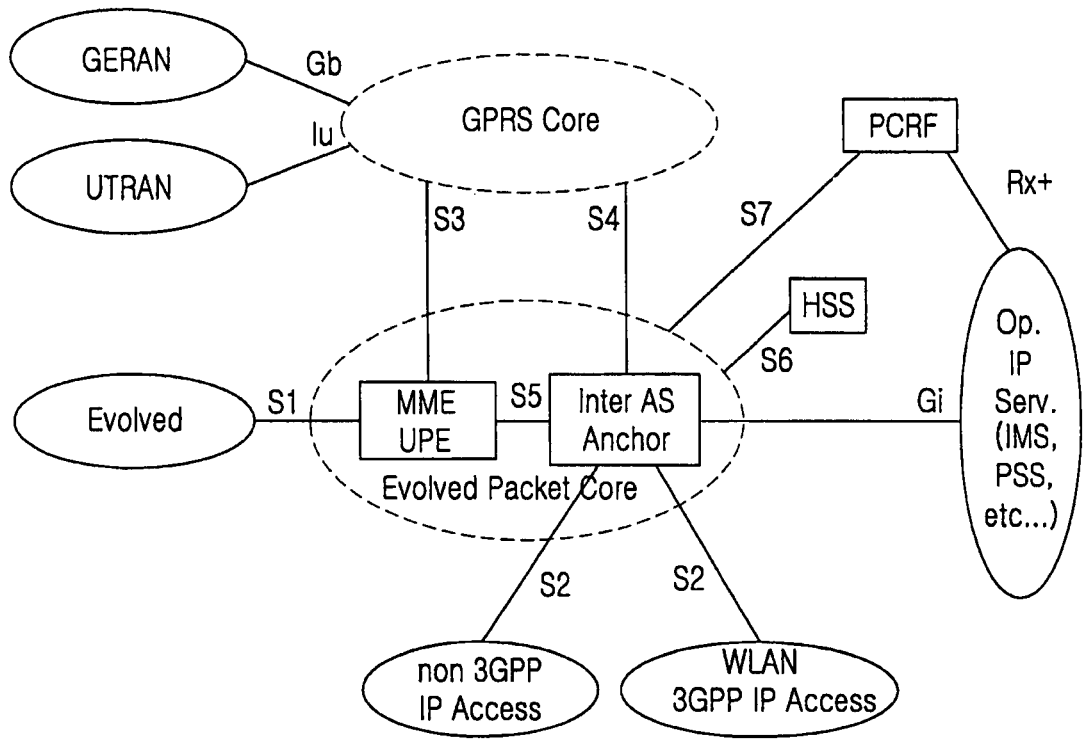
FIG. 1 illustrates the conventional Logical high-level architecture for the evolved system.
Figure 2:
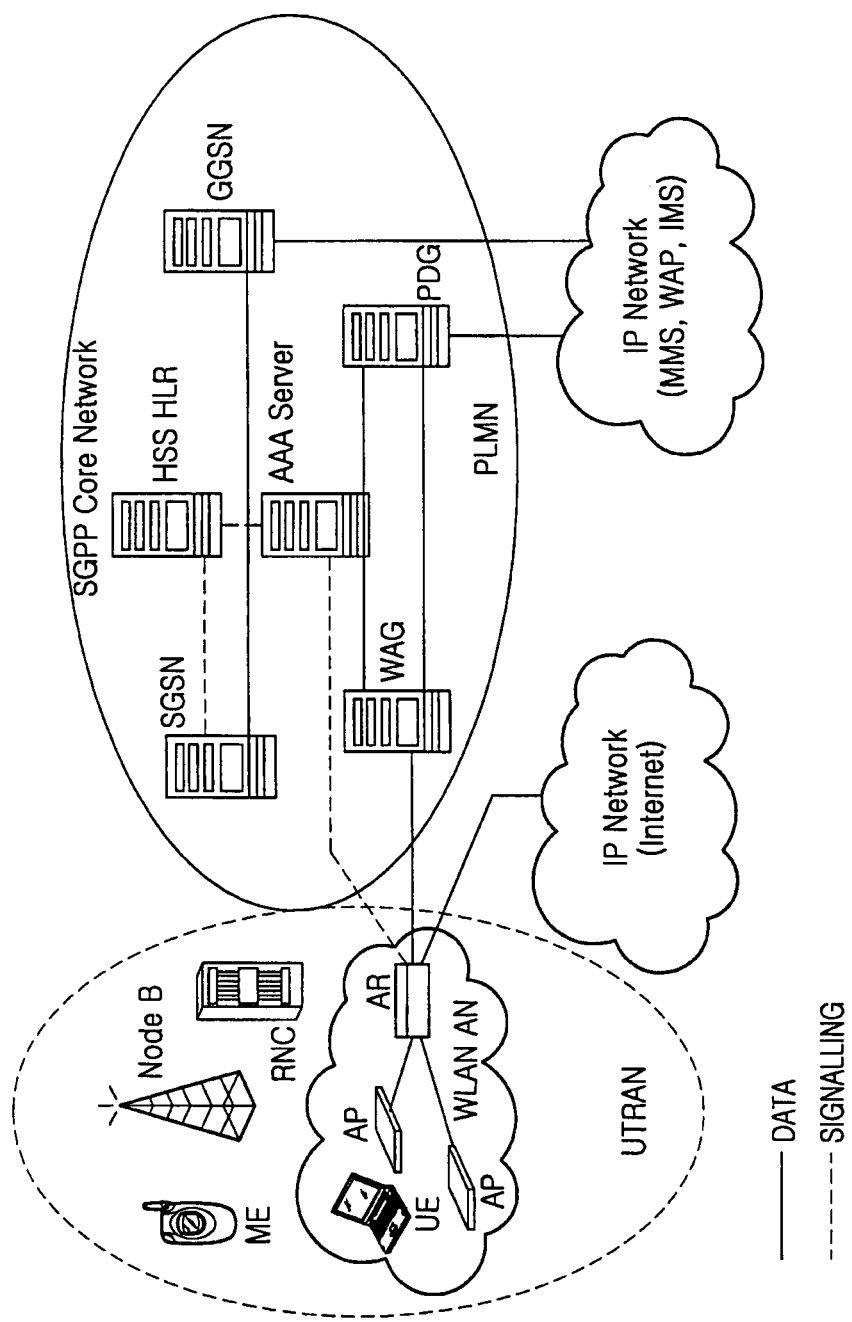
FIG. 2 illustrates the conventional IWLAN system architecture and network elements.
Figure 3:
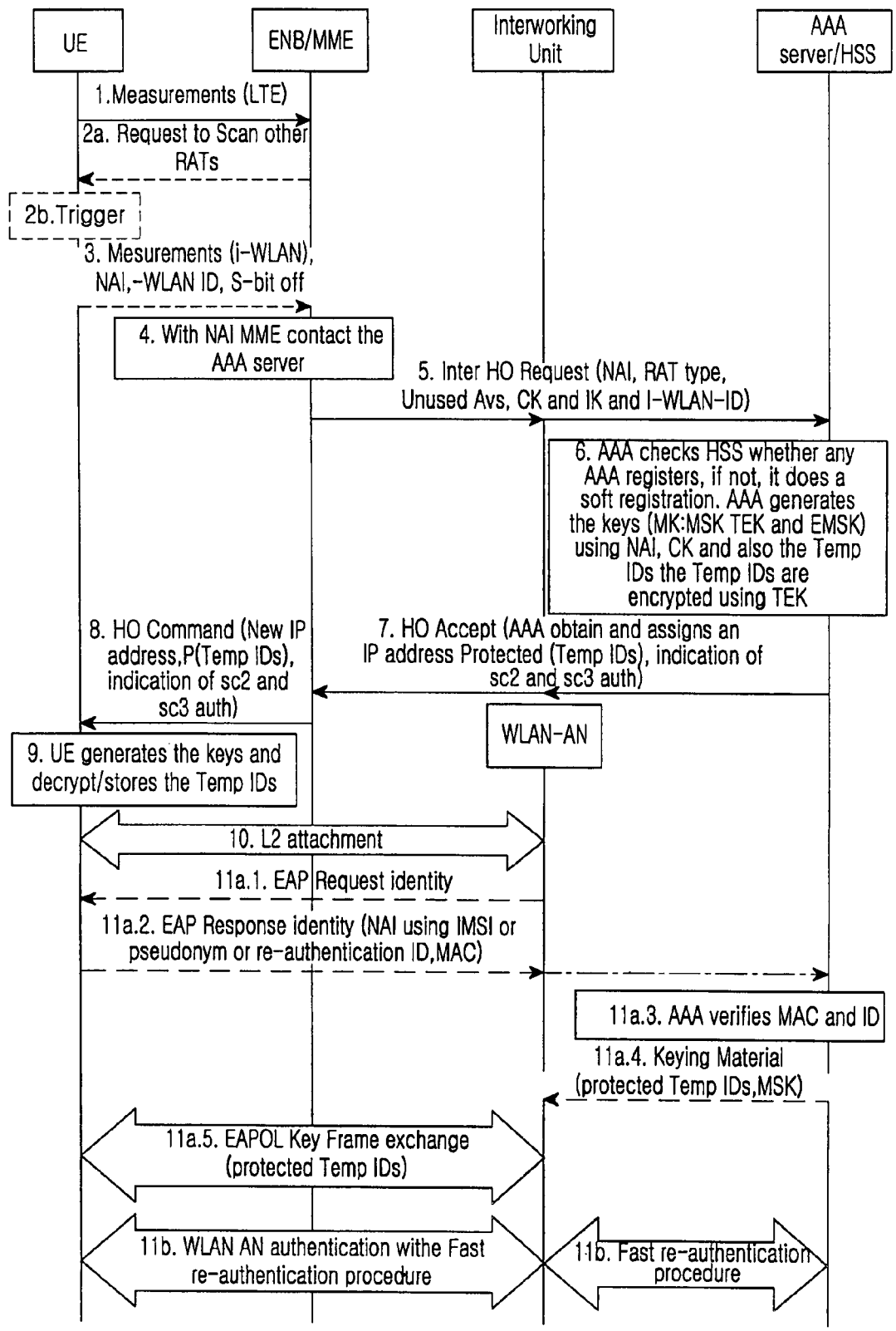
FIG. 3 illustrates the sequence of the message flow for Backward Handover from the SAE to the I-WLAN access system (Scenario 2 access) according to the present invention.

FIG. 3 illustrates a Backward Handover from the SAE to the I-WLAN access system (Scenario 2 access) according to the present invention.

Referring to FIG. 3, a UE sends periodic or event based measurements to the EUTRAN network in step 1. If the Evolving Node B (ENB)/Mobility Management Entity (MME) finds that the UE measurement is below the threshold or the MME decides in any manner that the EUTRAN cannot be continued, then the ENB/MME can request the UE to start scanning other Radio Access Technology (RATs) at step 2a, or alternatively, the ENB/MME can request the UE to scan a particular RAT which would be a neighboring RAT or available in its coverage area. Also, by Layer 2 (L2) or by some other means, the UE can decide that the EUTRAN cannot be continued and begin scanning the other RATs.

The UE sends the I-WLAN measurement report containing the I-WLAN ID and NAI with other parameters to the SAE system in step 3. Then the ENB/MME decides itself or optionally, with the help of a logical interworking unit, to handover the UE to the I-WLAN network.

Using a Network Address Identifier (NAI), the MME resolves the I-WLAN AAA server IP address and contacts the AAA server through the logical interworking unit in step 4. This logical interworking unit can be located within the MME or the AAA server, or alternatively, co-located within any network entity in the SAE the I-WLAN system. The functionality of the interworking unit is to convert the RAN and the CN containers/protocol/parameters of a first access system to a second access system.

The MME sends the HO request to the AAA server through the interworking unit in step 5. The HO request contains the NAI, I-WLAN ID, Unused Authentication Vectors (AVs), latest CK and IK and other parameters.

The AAA checks with a Home Subscription Service (HSS) whether any AAA is registered with the HSS(Home Subscriber Server), and if not, the AAA performs a soft registration in step 6. The AAA generates/derives the keys (MSK, TEK and EMSK) using NAI, CK and IK. The AAA server also generates the Temp IDs (pseudonym ID and the fast re-authentication ID), and protects (encrypts) the Temp IDs using derived TEK and then sends it to the UE.

In step 7, the AAA server sends the HO accept to the MME through the interworking unit. The HO accept message contains the protected Temp IDs and the indication of whether scenario 2 and scenario 3 authentication is required.

The MME forwards in step 8 the received parameters in the HO accept message as an HO command message to the UE.

After receiving the HO command from the SAE system to handover to the I-WLAN network, the UE in step 9 generates the keys (MSK, TEK and EMSK) using the latest CK and IK and decrypts the protected Temp IDs. In step 10, the UE starts the L2 attachment with the I-WLAN AS.

The WLAN-AN initiates the authentication procedure in step 11a.1, if the I-WLAN system requires the authentication.

Then, in step 11a.2 the UE sends the temp ID (fast re-authentication ID) if it is received in the HO command. The UE sends the EAP response identity with the temp ID (pseudonym ID or fast re-authentication ID), and optionally with the integrity protection of the EAP response identity message to the AAA server through the I-WLAN AN.

If the AAA server receives EAP response identity message with temp ID, then the AAA knows that the UE has done the HO preparation. The AAA server verifies in step 11a.3 the integrity protection and the temp ID. Thus, the AAA authenticates the UE. Optionally, the AAA Server can send the message EAP Request/AKA Notification, which is Medium Access Control (MAC) protected, previous to the EAP Success message, if the AAA server requested previously to use protected successful result indications. The AAA server generates the new temp Ds and sends them to the UE along with the EAP Request/AKA Notification message. The WLAN AN forwards the EAP Request/AKA Notification message to the UE, which sends the EAP Response/AKA-Notification. The WLAN AN forwards the EAP Response/AKA-Notification message to the AAA server, which ignores the contents of this message The AAA Server sends in step 11a.4 the EAP Success message to WLAN-AN. If some extra keying material was generated for WLAN technology specific confidentiality and/or integrity protection, then the AAA Server includes this keying material in the underlying AAA protocol message (i.e. not at the EAP level). The I-WLAN AN stores the keying material to be used in communication with the authenticated WLAN-UE. If the AAA server does not use protected successful result indications, then the AAA server generates the new temp IDs and sends them to the UE along with the EAP success message.

The I-WLAN AN informs the WLAN-UE in step 11a.5 about the successful authentication with the EAP Success message. At this time, the EAP AKA exchange has been successfully completed, and the WLAN-UE and the I-WLAN AN share keying material derived during that exchange.

Alternatively, in step 11b the UE initiates the fast re-authentication procedure with the I-WLAN network. If the UE does not receive the fast re-authentication ID, then the UE sends the pseudonym ID to initiate full authentication procedure.

Figure 4:
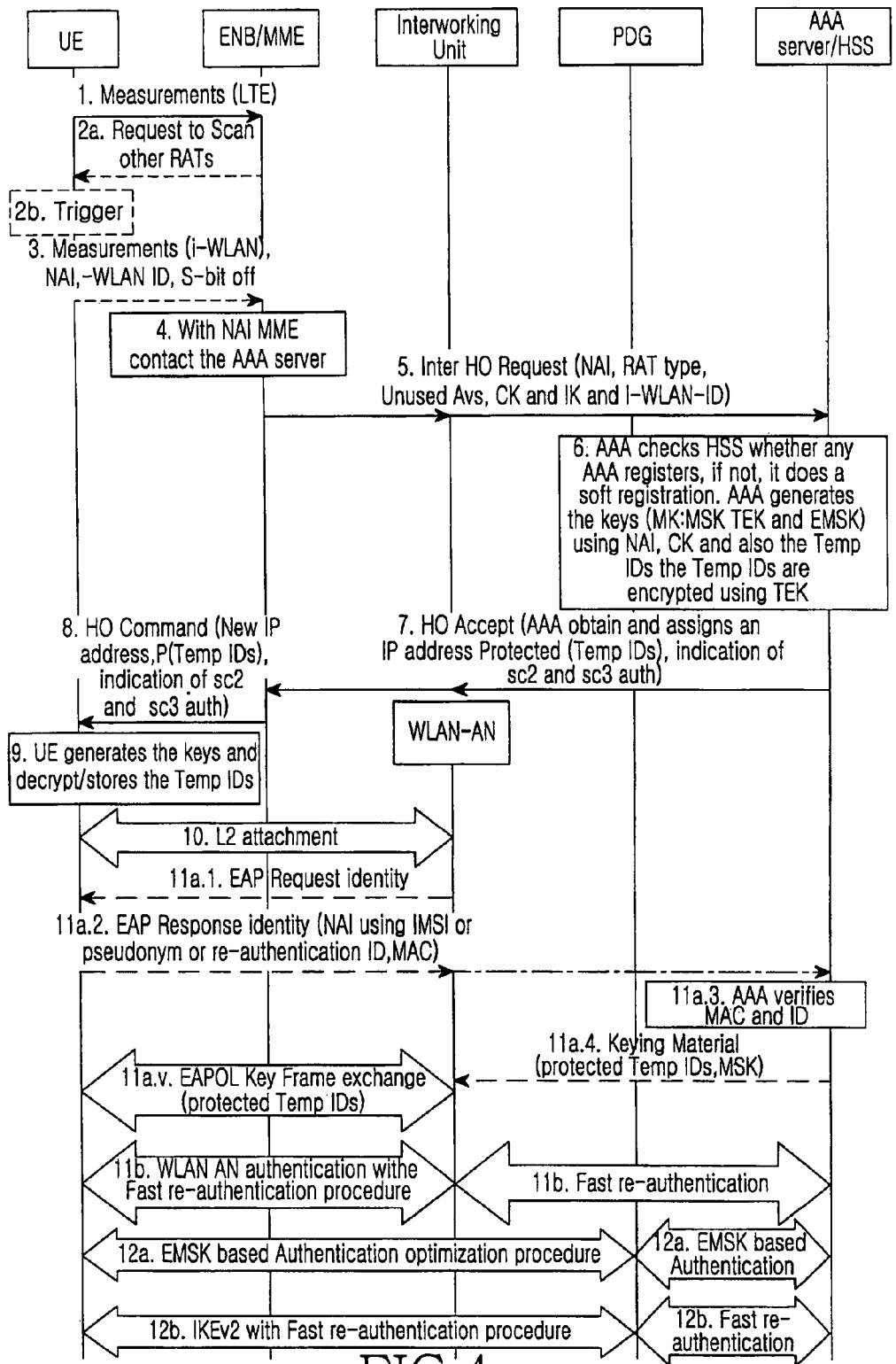
FIG. 4 illustrates the sequence of the message flow for Backward Handover from the SAE to the I-WLAN access system (Scenario 2 and Scenario 3 access) according to the present invention.

FIG. 4 illustrates a Backward Handover from the SAE to the I-WLAN access system (Scenario 2 and Scenario 3 access) according to the present invention.

Referring to FIG. 4, a UE sends periodic or event based measurements to the EUTRAN network in step 1.

If ENB/MME finds that UE measurement is below the threshold, or the MME decides in any manner that the EUTRAN cannot be continued, then in step 2a the ENB/MME can request the UE to start scanning other RATs or to scan a particular RAT which would be a neighboring RAT or available in its coverage area. Also, by L2 or by some other means, the UE can decide that the EUTRAN cannot be continued and begin scanning the other RATs.

The UE sends the I-WLAN measurement report containing the I-WLAN ID and NAI with other parameters to the SAE system in step 3. Then the ENB/MME decides to handover the UE to the I-WLAN network.

Using a Network Access Identifier (NAI), the MME resolves the I-WLAN AAA server IP address and contacts the AAA server through the logical interworking unit. In step 4. The logical interworking unit can be located within the MME or the AAA server, or alternatively co-located within any network entity in the SAE or the I-WLAN system. The functionality of the interworking unit is to convert the RAN and the CN containers/protocol/parameters of a first access system to a second access system.

The MME sends the HO request to the AAA server through the interworking unit in step 5. The HO request contains the NAI, I-WLAN ID, Unused AVs, latest CK and IK and other parameters.

The AAA checks with the HSS in step 6 whether any AAA is registered with the HSS. If not, the AAA performs a soft registration. The AAA generates/derives the keys (MSK, TEK and EMSK) using NAI, CK and IK. The AAA server also generates the Temp IDs (pseudonym ID and the fast re-authentication ID), protects (encrypts) the Temp IDs using derived TEK, and then sends them to the UE.

The AAA server sends in step 7 the HO accept to the MME through the interworking unit. The HO accept message contains the protected temp IDs and the indication of whether scenario 2 and scenario 3 authentication is required. The AAA server also includes the supported optimization procedure for the UEs which perform scenario 2 and scenario 3 consecutively within the HO accept.

In step 8, the MME forwards the received parameters in the HO accept message as an HO command message to the UE.

After receiving the HO command from the SAE system to handover to the I-WLAN network, in step 9 the UE generates the keys (MSK, TEK and EMSK) using the latest CK and IK and decrypts the protected Temp IDs (pseudonym ID and the fast re-authentication ID). In step 10, the UE begins the L2 attachment with the I-WLAN AS.

The WLAN-AN initiates the authentication procedure in step 11a.1, if the I-WLAN system requires the authentication. Then the UE sends in step 11a.2 the temp ID (fast re-authentication ID) if it is received in the HO command. The UE sends the EAP response identity with the temp ID (pseudonym ID or fast re-authentication ID), and optionally with the integrity protection of the EAP response identity message, to the AAA server through the I-WLAN AN.

If the AAA server receives the EAP response identity message with a temp ID, then the AAA knows that the UE has done the HO preparation. The AAA server in step 11a.3 verifies the integrity protection and the temp ID. Thus, the AAA authenticates the UE. Optionally, the AAA Server can send the message EAP Request/AKA Notification, which is MAC protected, previous to the EAP Success message, if the AAA server requested previously to use protected successful result indications. The AAA server generates the new temp IDs and sends to the UE along with the EAP Request/AKA Notification message. The WLAN AN forwards the EAP Request/AKA Notification message to the UE, which sends the EAP Response/AKA-Notification. The WLAN AN forwards the EAP Response/AKA-Notification message to the AAA server, which ignores the contents of this message.

The AAA Server sends in step 11a.4 the EAP Success message to WLAN-AN. If some extra keying material was generated for WLAN technology specific confidentiality and/or integrity protection, then the AAA Server includes this keying material in the underlying AAA protocol message (i.e. not at the EAP level). The I-WLAN AN stores the keying material to be used in communication with the authenticated WLAN-UE. If the AAA server does not use protected successful result indications, then the AAA server generates the new temp IDs and sends them to the UE along with the EAP success message.

The I-WLAN AN informs the WLAN-UE about the successful authentication with the EAP Success message in step 11a.5. At this time, the EAP AKA exchange has been successfully completed, and the WLAN-UE and the I-WLAN AN share keying material derived during that exchange.

Alternatively, the UE initiates the fast re-authentication procedure with the I-WLAN network in step 11b. If the UE does not receive the fast re-authentication ID, then the UE sends the pseudonym ID to initiate a full authentication procedure.

After the successful scenario 2 authentication procedure, the UE initiates in step 12a the optimized authentication procedure for the scenario 3 listed by the AAA server in the HO command. The UE may initiate the scenario 3 authentication procedure using the EMSK based optimization procedure.

Alternatively, in step 12b the UE may initiate the fast re-authentication procedure for scenario 3 authentication procedure.

Figure 5:
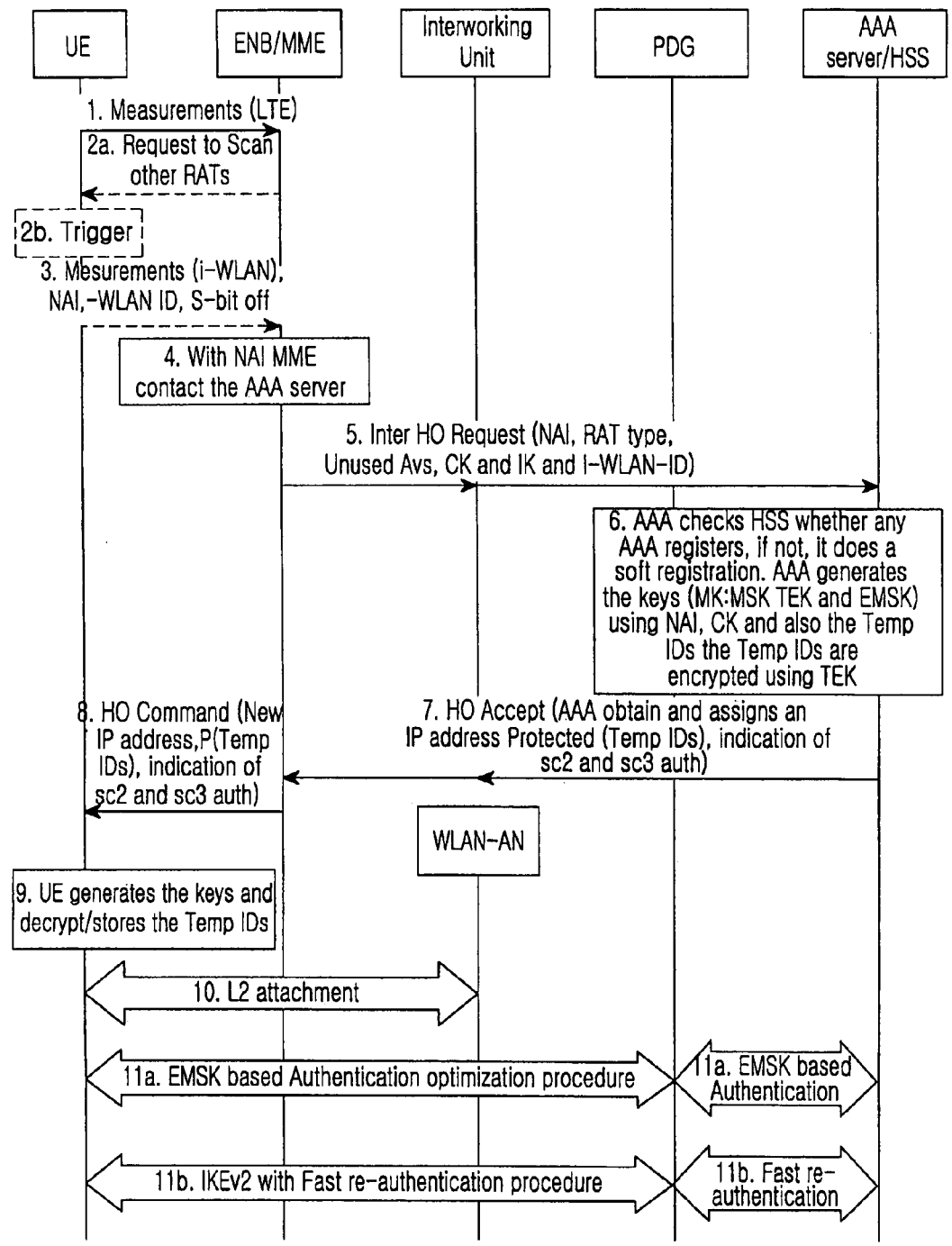
FIG. 5 illustrates the sequence of the message flow for Backward Handover from the SAE to the I-WLAN access system (Scenario 3 access) according to the present invention.

FIG. 5 illustrates a Backward Handover from the SAE to the I-WLAN access system (Direct Scenario 3 access) according to the present invention.

Referring to FIG. 5, a UE sends periodic or event based measurements to the EUTRAN network in step 1.

If the ENB/MME finds that UE measurement is below the threshold or MME decides in any manner that the EUTRAN cannot be continued, then in step 2 the ENB/MME can request the UE to start scanning other RATs, or request the UE to scan a particular RAT which would be a neighboring RAT or available in its coverage area. Alternatively, by L2 or by some other means, the UE decides that the EUTRAN cannot be continued and starts scanning the other RATs.

The UE sends the I-WLAN measurement report containing the I-WLAN ID and NAI with other parameters to the SAE system in step 3. Then the ENB/MME decides to handover the UE to the I-WLAN network.

Using NAI, the MME resolves the I-WLAN AAA server IP address and contacts the AAA server through the logical interworking unit in step 4. This logical interworking unit can be located within the MME or the AAA server, or alternatively co-located within any network entity in the SAE or the I-WLAN system. The functionality of the interworking unit is to convert the RAN and the CN containers/protocol/parameters of a first access system to a second access system.

The MME sends the HO request to the AAA server through the interworking unit in step 5. The HO request contains the NAI, I-WLAN ID, Unused AVs, latest CK and IK and other parameters.

The AAA checks with the HSS whether any AAA is registered with the HSS, and if not, the AAA performs a soft registration. The AAA generates/derives the keys (MSK, TEK and EMSK) using NAI, CK and IK. The AAA server also generates the Temp IDs (pseudonym ID and the fast re-authentication ID) and protects (encrypts) the Temp IDs using derived TEK. Then the AAA sends the Temp IDs to the UE.

The AAA server sends the HO accept to the MME through the interworking unit in step 7. The HO accept message contains the protected temp IDs and the indication of whether scenario 2 and scenario 3 authentication is required. The AAA server also includes the supported optimization procedure for the UEs which consecutively perform scenario 2 and scenario 3 within the HO accept.

The MME forwards the received parameters in the HO accept message in the HO command message to the UE in step 8.

After receiving the HO command from the SAE system to handover to the I-WLAN network, the UE in step 9 generates the keys (MSK, TEK and EMSK) using the latest CK and IK and decrypts the protected Temp IDs.

In step 10, the UE begins the L2 attachment with the I-WLAN AS.

After a successful attachment with the I-WLAN AN, the UE initiates in step 11a the optimized authentication procedure for the scenario 3 listed by the AAA server in the HO command. The UE may initiate the scenario 3 authentication procedure using the EMSK based optimization procedure.

Alternatively, in step 11b the UE may initiate the fast re-authentication procedure for scenario 3 authentication procedure.

Forward Handover from the SAE System to the I-WLAN AS:

During the authentication procedure, the UE can send the details of the previous access system, so that the core network can retrieve the security context and the buffered packets from the old access system. The details of the last access system can be sent within the EAPOL ID response messages.

During the scenario-2 authentication procedure, if the UE and the network derive the keys using the CK and IK, then the core network can generate a temp ID and pass it to the UE. The UE can begin a fast re-authentication procedure for scenario-3 access.

The UE can send the sequence number of the last successfully received packet to the I-WLAN network, which can forward the same to core network. Then, the core network starts forwarding the packets after the last successful received sequence number by the UE.

Figure 6:
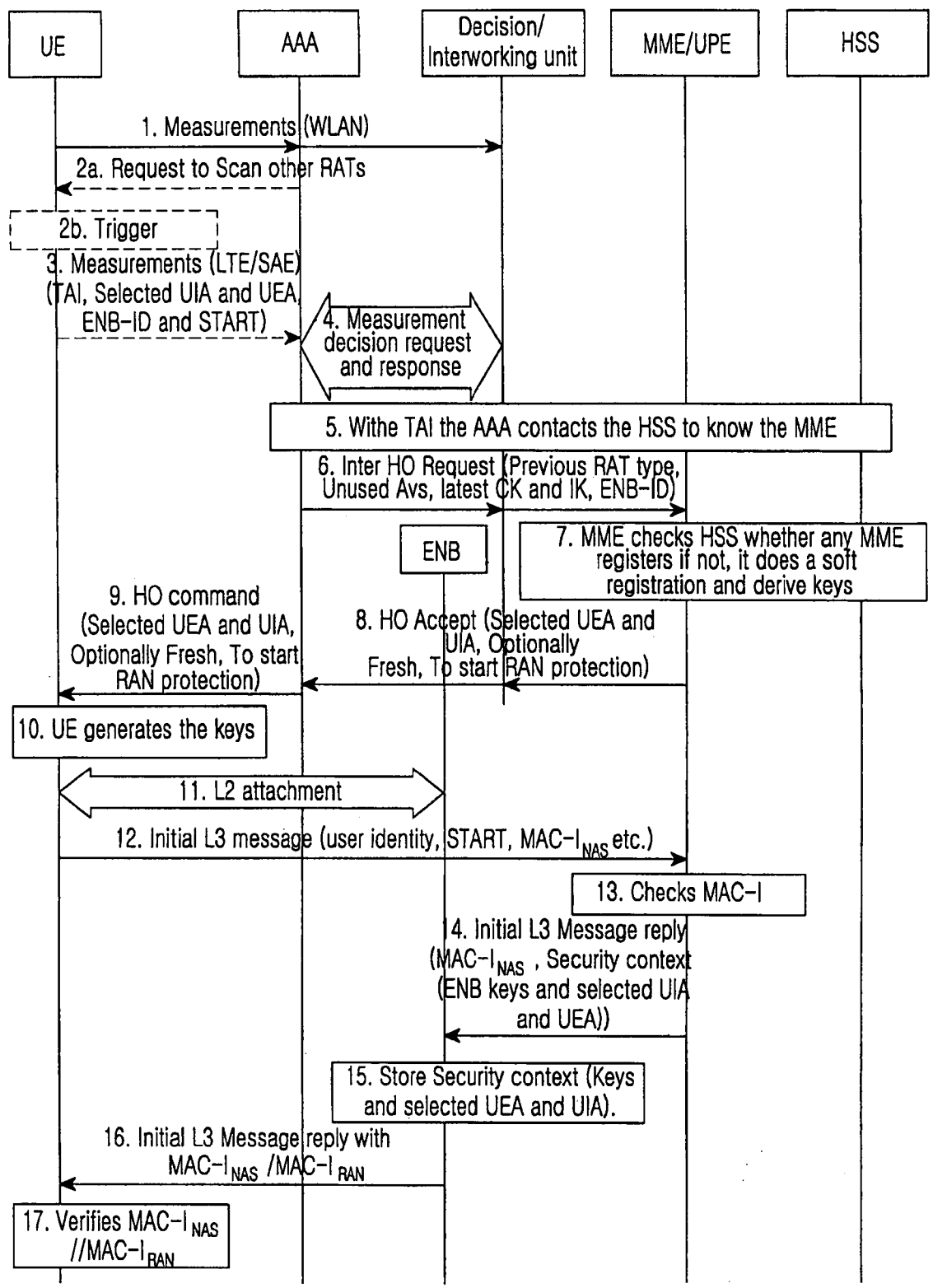
FIG. 6 illustrates the sequence of the message flow for Backward Handover from I-WLAN to LTE (Alternative-1) according to the present invention.

FIG. 6 illustrates a Backward Handover from the I-WLAN to the SAE system (Alternative-1) according to the present invention.

Referring to FIG. 6, a UE sends periodic or event based measurements to the logical decision and interworking unit in step 1. This logical decision and interworking unit can be located within the MME or the AAA server or as a separate entity, or alternatively co-located within any network entity in the SAE system or in the I-WLAN system. The functionality of the decision and interworking unit is to convert the RAN and the CN containers/protocol/parameters of a first access system to a second access system, and also to decide whether to HO based on the measurements.

If the logical decision and interworking unit finds that UE measurement is below the threshold or decides by any other means that I-WLAN cannot be continued, then in step 2 the logical decision and interworking unit can request the UE to start scanning other RATs, or the ENB/MME can request the UE to scan a particular RAT which would be a neighboring RAT or available in its coverage area. Alternatively, by L2 or some other means, the UE decides that the I-WLAN cannot be continued and starts scanning the other RATs.

The UE sends the SAE measurement report containing the TAI, selected UIA and UEA, ENB-ID and optionally, START value the logical decision and interworking unit through the AAA server in step 3.

Then in step 4 the logical decision and interworking unit decides to handover the UE to the SAE network and informs the AAA server.

Using TAI, the AAA server knows the MME address by contacting the HSS.

Then in step 6 the AAA server sends the HO request message to the MME/UPE. The HO request message contains Previous RAT type, Unused AVs, latest CK and IK, optionally ENB-ID and other parameters.

The MME checks HSS whether any MME is registered with the HSS, and if not, it performs a soft registration in step 7. The MME also generates/derives the keys.

The MME sends the HO accept to the AAA server through the interworking unit in step 8. The HO accept message contains the selected UEA and UIA, optionally FRESH and whether to start RAN protection and other parameters.

The AAA server forwards the received parameters in the HO accept message in the HO command message to the UE in step 9.

After receiving the HO command from the AAA server to handover to the SAE network, the UE derives the keys specific to the SAE system using the latest CK and IK in step 10.

The UE starts the L2 attachment with the ENB without any protection in step 11.

The UE sends the initial Layer 3 (L3) message to the MME/UPE in step 12. The initial L3 message contains the user identity, START value and the MAC-$I_{NAS}$. The MAC-$I_{NAS}$ is calculated using the derived SAE specific key, and optionally FRESH[PLEASE DEFINE] and START values.

The MME/UPE verifies the MAC-I using the derived keys, the received START and optionally FRESH value in step 13.

The MME/UPE sends the Initial L3 message reply, which includes the keys for the ENB, START, optionally FRESH and also the agreed UEA and the UIA. The MME calculates the MAC-$I_{NAS}$ over the Initial L3 message reply excluding the keys for the ENB START, optionally FRESH and also the agreed UEA and the UIA.

The ENB receives the Initial L3 message reply and stores the keys START, optionally FRESH and the agreed UEA and UIA.

Then the ENB forwards the Initial L3 message reply to the UE. Optionally the ENB can start the RAN security (MAC-$I_{RAN}$).

The UE verifies the MAC-$I_{NAS}$ and MAC-$I_{RAN}$.

Figure 7:
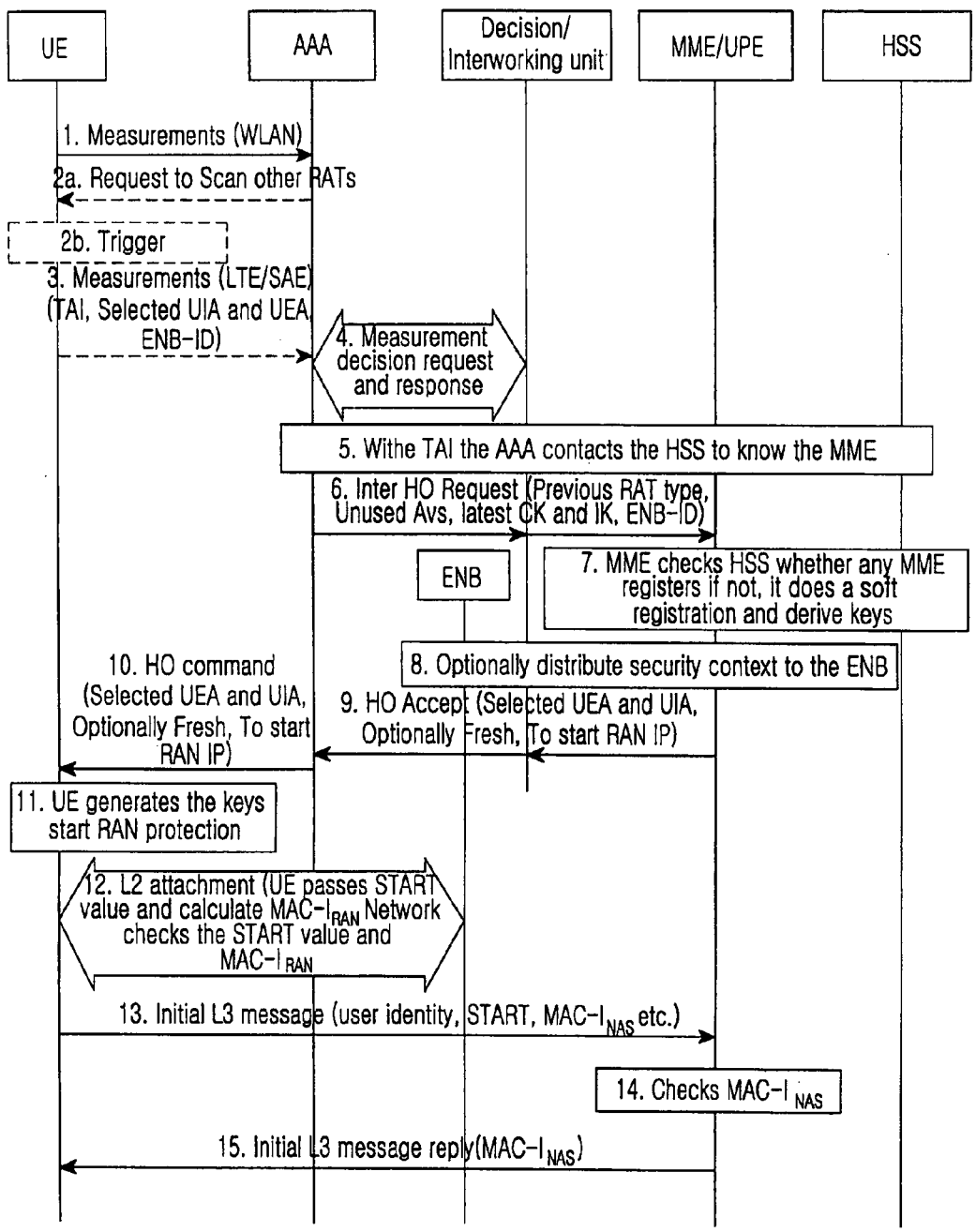
FIG. 7 illustrates the sequence of the message flow for Backward Handover from I-WLAN to LTE (Alternative-2) according to the present invention.

FIG. 7 illustrates a backward Handover from the I-WLAN to the SAE system (Alternative-2) according to the present invention.

Referring to FIG. 7, a UE sends periodic or event based measurements to the logical decision and interworking unit in step 1. This logical decision and interworking unit can be located within the MME or the AAA server, or as a separate entity or alternatively co-located within any network entity in the SAE or the I-WLAN system. The functionality of the decision and interworking unit is to convert the RAN and the CN containers/protocol/parameters of a first access system to a second access system and also to decide whether to HO based on the measurements.

If the logical decision and interworking unit finds that UE measurement is below the threshold or decides by any other manner that the I-WLAN cannot be continued, then the logical decision and interworking unit can request the UE to start scanning other RATs or ENB/MME request the UE to scan a particular RAT which would be a neighboring RAT or available in its coverage Alternatively, by L2 or by some other means, the UE decides that the I-WLAN cannot be continued and starts scanning the other RATs.

The UE sends the SAE measurement report containing the TAI, selected UIA and UEA, ENB-ID and optionally START value to the logical decision and interworking unit through the AAA server in step 3.

Then the logical decision and interworking unit decides to handover the UE to the SAE network and informs the same to the AAA server.

Using TAI, the AAA server knows the MME address by contacting the HSS in step 5.

Then the AAA server sends HO request message to the MME/UPE in step 6. The HO request message contains Previous RAT type, Unused AVs, latest CK and IK, and optionally ENB-ID and other parameters.

In step 7 the MME checks the HSS whether any MME is registered with the HSS, and if not, the MME does a soft registration. MME generates/derives the keys using the CK and IK sent by the AAA server.

The MME generates FRESH and distribute the security context to the ENB, using the ENB-ID in step 8.

The MME sends the HO accept to the AAA server through the interworking unit in step 9. The HO accept message contains the selected UEA and UIA, and optionally FRESH and to start RAN protection and other parameters.

The AAA server forwards in step 10 the received parameters in the HO accept message in the HO command message to the UE.

After receiving the HO command from the AAA server to handover to the SAE network, the UE derives the keys specific to the SAE system using the latest CK and IK and starts the RAN protection in step 11.

The UE starts the L2 attachment with the ENB in step 12. The UE starts protecting the RRC messages. During the initial message to the ENB, the UE passes the START value and calculates the MAC-I$_{RAN}$ using the derived SAE specific key, optionally FRESH and START value. Then the ENB verifies the MAC-I$_{RAN}$ using the security context received in step 8 along with the START value.

The UE sends in step 13 the initial L3 message to the MME/UPE. The initial L3 message contains the user identity, START value and the MAC-I$_{NAS}$. The MAC-I$_{NAS}$ is calculated using the derived SAE specific key, optionally FRESH and START value.

The MME/UPE verifies the MAC-I using the derived keys, the received START and optionally FRESH value in step 14.

The MME/UPE sends the Initial L3 message reply. The MME calculates the MAC-I$_{NAS}$ over the Initial L3 message reply.

Forward Handover from the I-WLAN to the SAE System:

During the TAU procedure or initial NAS message, the UE can send the details of the previous access system within the TAU procedure, such that core network can retrieve the security context (CK and IK) and the buffered packets from the old access system.

Figure 8:
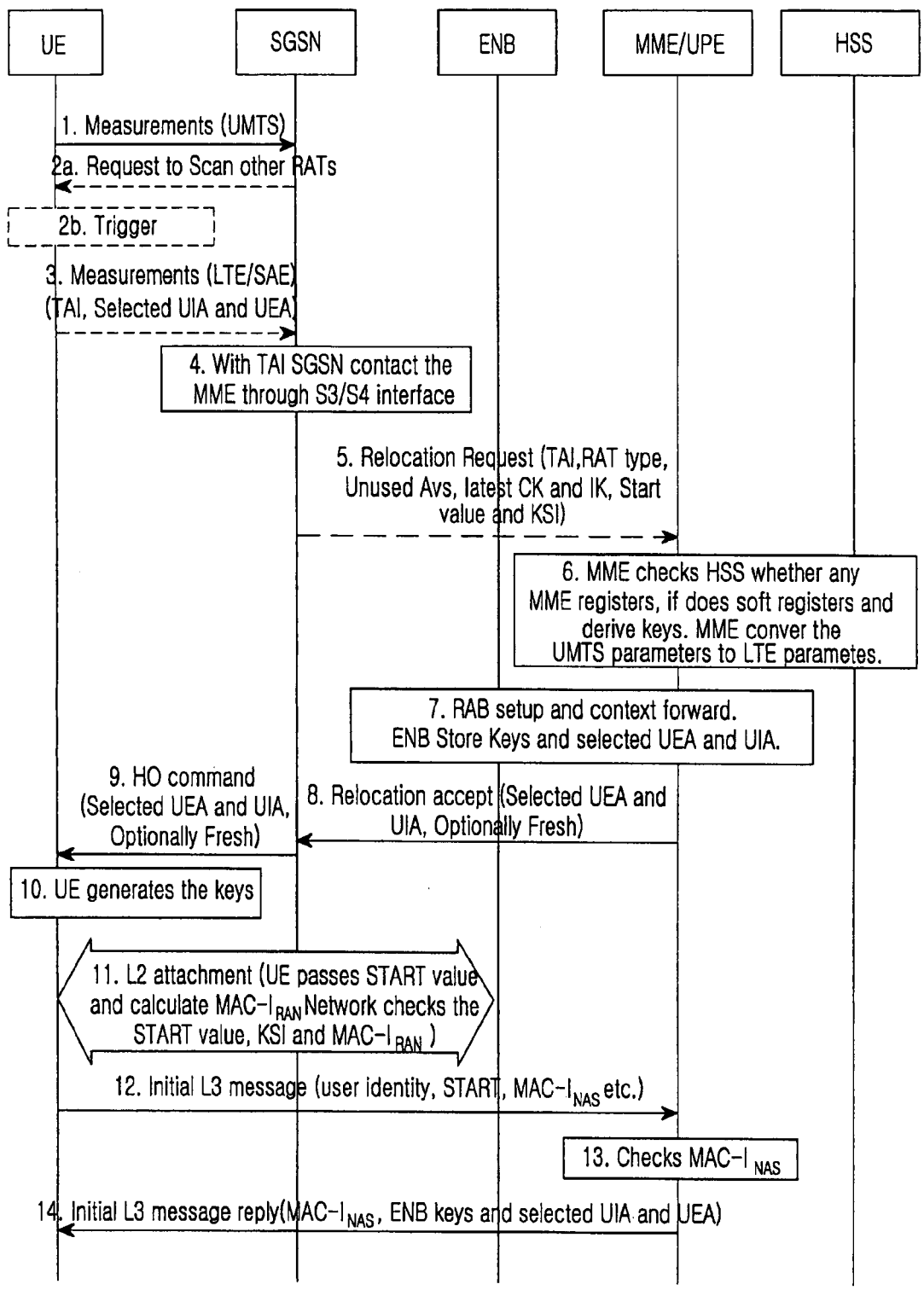
FIG. 8 illustrates the sequence of the message flow for Backward Handover from UMTS system to LTE system according to the present invention.

FIG. 8 illustrates a Backward Handover from the UMTS to the SAE system according to the present invention.

Referring to FIG. 8, a UE sends periodic or event based measurements to the SGSN in step 1.

Based on the measurement report, the SGSN can request the UE to start scanning other RATs, or the ENB/MME can request the UE to scan a particular RAT which would be a neighboring RAT or available in its coverage area in step 2. Alternatively, by L2 or by some other means, the UE decides that the UMTS cannot be continued and starts scanning the other RATs.

The UE sends the SAE measurement report containing the TAI, selected UIA and UEA and optionally START value and/or ENB ID to the SGSN in step 3.

Then the SGSN decides to handover the UE to the SAE network. Using TAI, the SGSN knows the MME address and contacts the MME using the S3 or S4 interface or by contacting the HSS or by any other manner in step 4.

Then the SGSN sends a HO request message to the MME/UPE in step 5. The HO request message contains security context, Previous RAT type, Unused AVs, latest CK and IK, and optionally ENB-ID, START value, KSI and other parameters.

In step 6 the MME checks with HSS whether any MME is registered with the HSS, and if not, MME does a soft registration. MME generates/derives the keys using the CK and IK sent by the SGSN. The MME converts the UMTS parameters to SAE specific parameters by using the logical interworking unit which can be located within the MME or within the AAA server or alternatively co-located within any network entity in the SAE system or in the I-WLAN system. The functionality of the interworking unit is to convert the RAN and the CN containers/protocol/parameters of one access system to another.

In step 7 the MME generates FRESH and distributes the security context which includes ENB keys for RAN protection, selected UIA and UEA, FRESH, START, KSI and other parameters to the ENB, using the ENB-ID.

In step 8 the MME sends the HO accept to the SGSN. The HO accept message contains the selected UEA and UIA, and optionally FRESH.

The SGSN forwards the received parameters in the HO accept message in the HO command message to the UE in step 9.

After receiving the HO command from the SGSN to handover to the SAE network, the UE in step 10 derives the keys specific to the SAE system using the latest CK and IK and optionally starts the RAN protection.

The UE starts the L2 attachment with the ENB in step 11. The UE optionally starts protecting the RRC messages. During the initial message to the ENB, the UE passes the START value and calculates the MAC-I$_{RAN}$ using the derived SAE specific key, optionally FRESH and START value. Then the ENB verifies the MAC-I$_{RAN}$ using the security context received in step 8 along with the START value.

In step 12 the UE sends the initial L3 message to the MME/UPE. The initial L3 message contains the user identity, START value, KSI and the MAC-I$_{NAS}$. The MAC-I$_{NAS}$ is calculated using the derived SAE specific key, and optionally FRESH and START value.

The MME/UPE verifies the MAC-I$_{NAS}$ using the derived keys, the received START and optionally FRESH value in step 13.

The MME/UPE sends the Initial L3 message reply in step 14. The MME calculates the MAC-I$_{NAS}$ over the Initial L3 message reply.

Forward Handover from the UMTS to the SAE System:

During the TAU procedure or initial NAS message, the UE can send the details of the previous access system, so that the core network can retrieve the security context (CK and IK) and the buffered packets from the old access system.

Figure 9:
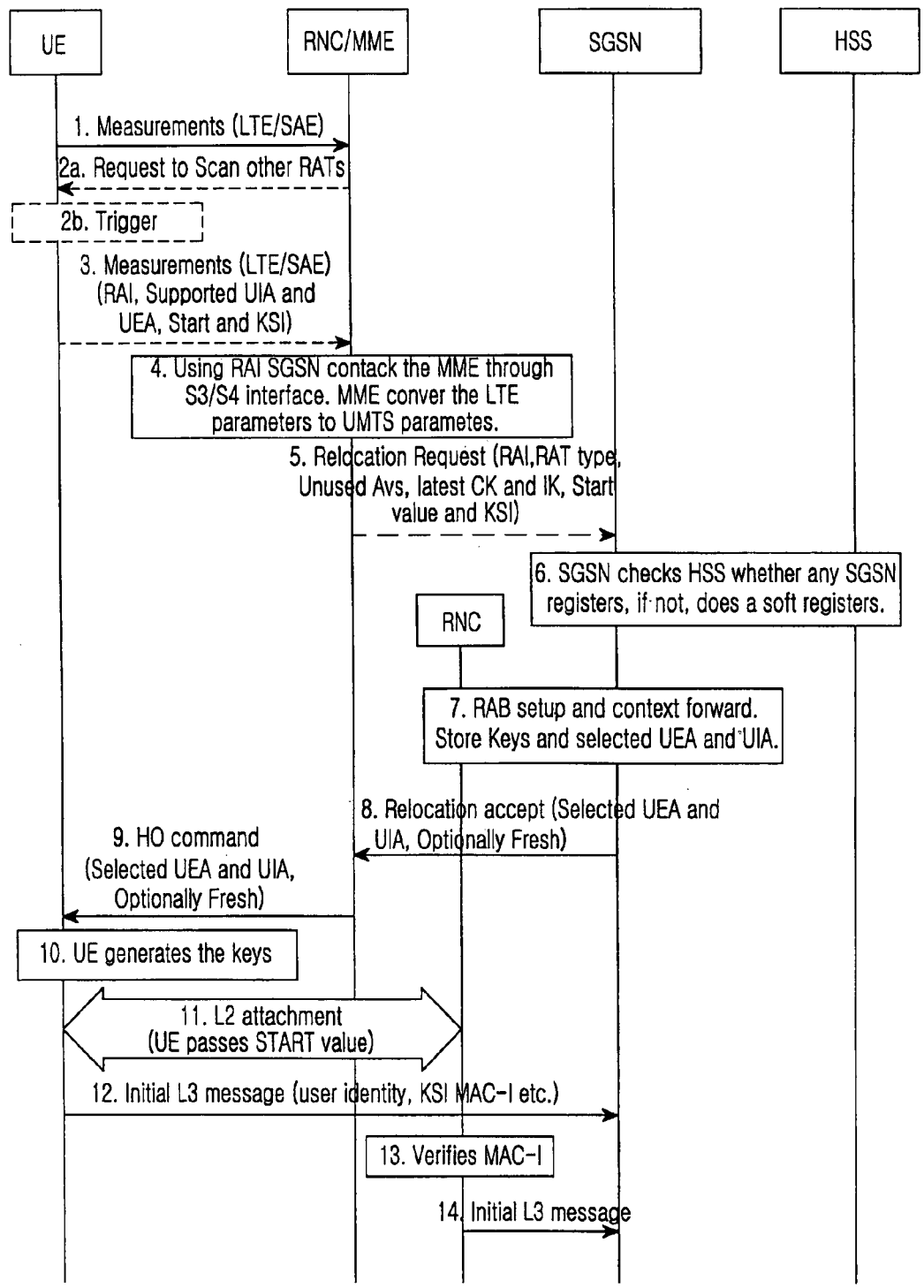
FIG. 9 illustrates the sequence of the message flow for Backward Handover from LTE system to UMTS system according to the present invention.

FIG. 9 illustrates a backward Handover from the SAE to the UMTS system according to the present invention.

Referring to FIG. 9, a UE sends periodic or event based measurements to the ENB/MME in step 1.

Based on the measurement report, the ENB/MME in step 2 can request the UE to start scanning other RATs or ENB/MME request the UE to scan a particular RAT which would be a neighboring RAT or available in its coverage area. Alternatively, by L2 or by some other means, the UE decides that the EUTRAN cannot be continued and starts scanning the other RATs.

The UE sends the UMTS measurement report containing the RAI, supported UIA and UEA, KSI and START value and cell ID to the ENB/MME in step 3.

Then the SGSN decides to handover the UE to the UMTS network in step 4. Using RAI, the MME knows the SGSN address and contact the SGSN using the S3 or S4 interface or by contacting the HSS or by any other well-known manner.

Then the MME sends in step 5 a HO request message to the SGSN. The HO request message contains security context, Previous RAT type, Unused AVs, latest CK and IK, and optionally cell-ID, START value, KSI and other parameters. MME converts the SAE parameters to UMTS specific parameters by using the logical interworking unit which can be located within the MME or within the SGSN or as a separate network entity or alternatively co-located within any network entity in the SAE or the UMTS system. The functionality of the interworking unit is to convert the RAN and the CN containers/protocol/parameters of a first access system to a second access system.

The SGSN checks with the HSS whether any SGSN is registered with the HSS, and if not, it performs a soft registration in step 6.

In step 7 the SGSN generates FRESH, and distributes the security context which includes keys for protection, selected UIA and UEA, FRESH, START, KSI and other parameters to the RNC, using the cell-ID. RNC stores the received parameters.

The SGSN sends the HO accept to the MME in step 8. The HO accept message contains the selected UEA and UIA, and optionally FRESH.

The MME forwards the received parameters in the HO accept message in the HO command message to the UE in step 9.

After receiving the HO command from the MME to handover to the UMTS network, the UE uses the latest CK and IK for the UMTS network and optionally starts the RAN protection in step 10.

The UE starts the L2 attachment with the RNC in step 11. The UE optionally starts protecting the RRC messages. During the initial message to the RNC, the UE passes the START value.

The UE sends the initial L3 message to the SGSN in step 12. The initial L3 message contains the user identity, START value, KSI and the MAC-I.

The RNC verifies the MAC⁻ in step 13, and forwards to the SGSN in step 14.

Forward Handover from the SAE to the UMTS System:

During the RAU procedure or first NAS message, the UE can send the details of the last/old access system, so that the core network can retrieve the security context (CK and IK) and the buffered packets from the old access system.

Figure 10:
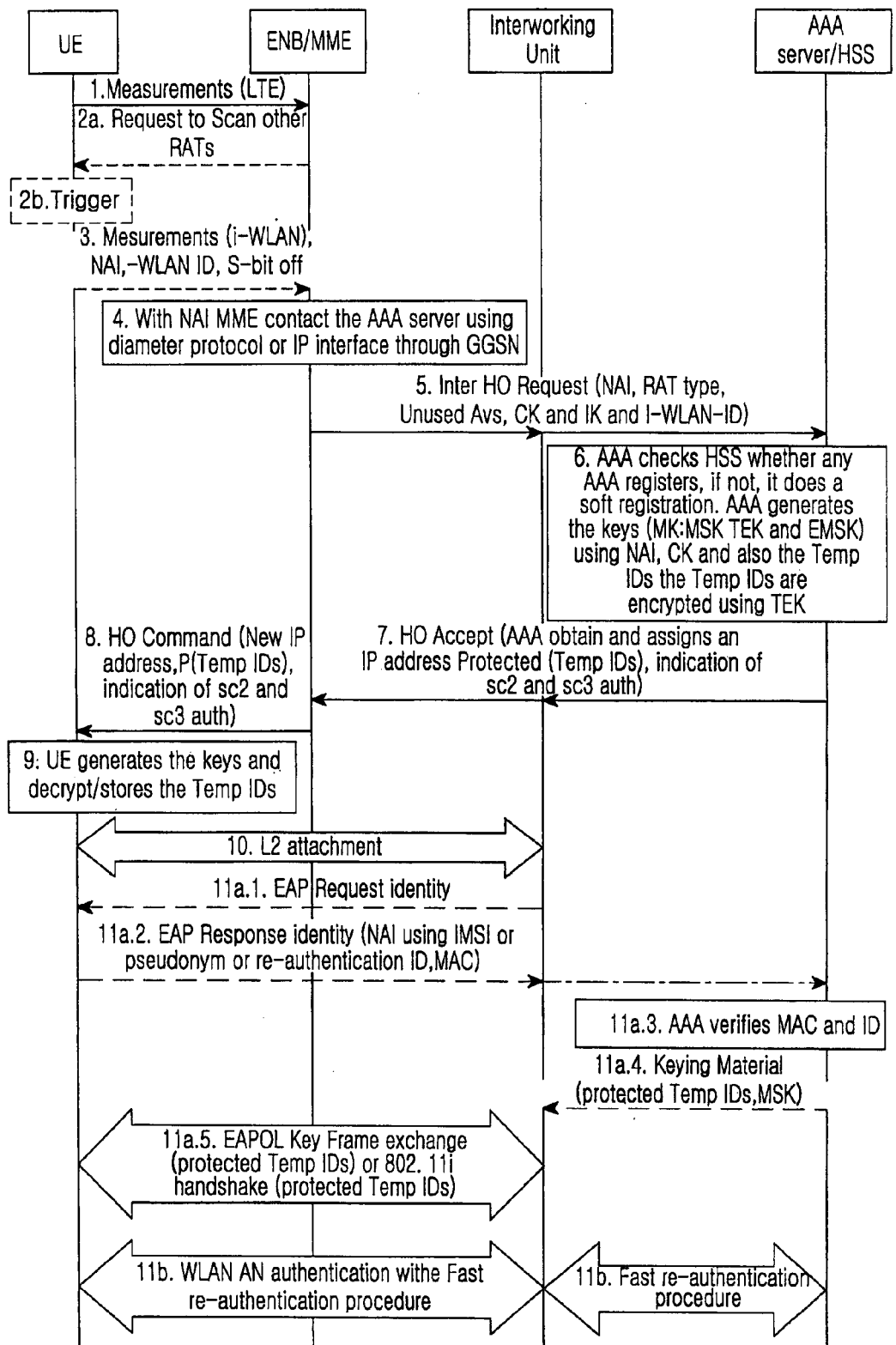
FIG. 10 illustrates the sequence of the message flow for Backward Handover from the UMTS to the I-WLAN access system (Scenario 2 access) according to the present invention.

FIG. 10 illustrates a backward Handover from the UMTS to the I-WLAN access system (Scenario 2 access) according to the present invention.

Referring to FIG. 10, a UE sends periodic or event based measurements to the UTRAN network in step 1.

If an RNC/SGSN finds that the UE measurement is below the threshold or the SGSN decides in any manner that EUTRAN cannot be continued, then RNC/SGSN can request the UE to start scanning other RATs or the ENB/MME can request the UE to scan a particular RAT which would be a neighboring RAT or available in its coverage area in step 2. Alternatively, by L2 or by some other means, the UE decides that the UTRAN cannot be continued and starts scanning the other RATs.

The UE sends the I-WLAN measurement report containing the I-WLAN ID and NAI with other parameters to the SGSN in step 3. Then the SGSN decides to handover the UE to the I-WLAN network.

Using NAI, the SGSN in step 4 resolves the I-WLAN AAA server IP address and contacts the AAA server through the logical interworking unit, which can be located within the SGSN or the AAA server or as a separate network entity. Alternatively it can be co-located within any network entity in the UMTS system or in the I-WLAN system. The functionality of the interworking unit is to convert the RAN and the CN containers/protocol/parameters of a first access system to a second access system.

The SGSN sends the HO request to the AAA server through the interworking unit in step 5. The HO request contains the NAI, I-WLAN ID, Unused AVs, latest CK and IK and other parameters.

The AAA checks with the HSS whether any AAA is registered with the HSS, and if not, the AAA performs a soft registration in step 6. The AAA generates/derives the keys (MSK, TEK and EMSK) using NAI, CK and IK, and the Temp IDs (pseudonym ID and the fast re-authentication ID). The AAA server protects (encrypts) the Temp IDs using derived TEK and then sends them to the UE.

The AAA server sends the HO accept to the SGSN through the interworking unit in step 7. The HO accept message contains the protected temp IDs and the indication of whether scenario 2 and scenario 3 authentication is required.

The SGSN forwards the received parameters in the HO accept message in the HO command message to the UE in step 8.

After receiving the HO command from the UMTS system to handover to the I-WLAN network, the UE generates the keys (MSK, TEK and EMSK) using the latest CK and IK and decrypts the protected Temp IDs (pseudonym ID and the fast re-authentication ID) in step 9.

The UE starts the L2 attachment with the I-WLAN AS in step 10.

In step 11*a*.1 the WLAN-AN initiates the authentication procedure, if the I-WLAN system requires the authentication.

Then in step 11*a*.2 the UE sends the temp ID (fast re-authentication ID) if it is received in the HO command. The UE sends the EAP response identity with the temp ID (pseudonym ID or fast re-authentication ID) and with the integrity protection of the EAP response identity message to the AAA server through the I-WLAN AN.

If the AAA server receives an EAP response identity message with a temp ID, then the AAA knows that the UE has performed the HO preparation. The AAA server verifies in step 11*a*.3 the integrity protection and the temp ID. Thus, AAA authenticates the UE. Optionally the AAA Server may send the MAC protected message EAP Request/AKA Notification, previous to the EAP Success message, if the AAA server requested previously to use protected successful result indications. The AAA server generates the new temp IDs and sends them to the UE along with the EAP Request/AKA Notification message. The WLAN AN forwards the EAP Request/AKA Notification message to the UE. The UE sends the EAP Response/AKA-Notification. The WLAN AN forwards the EAP Response/AKA-Notification message to the AAA server, which ignores the contents of this message.

The AAA Server sends in step 11*a*.4 the EAP Success message to WLAN-AN. If some extra keying material was generated for WLAN technology specific confidentiality and/or integrity protection, then the AAA Server includes this keying material in the underlying AAA protocol message (i.e. not at the EAP level). The I-WLAN AN stores the keying material to be used in communication with the authenticated WLAN-UE. If the AAA server does not use protected successful result indications, then the AAA server generates the new temp IDs and sends them to the UE along with the EAP success message.

The I-WLAN AN informs the WLAN-UE about the successful authentication with the EAP Success message in step 11*a*.5. At this time, the EAP AKA exchange has been successfully completed, and the WLAN-UE and the I-WLAN AN share keying material derived during that exchange.

Figure 11:
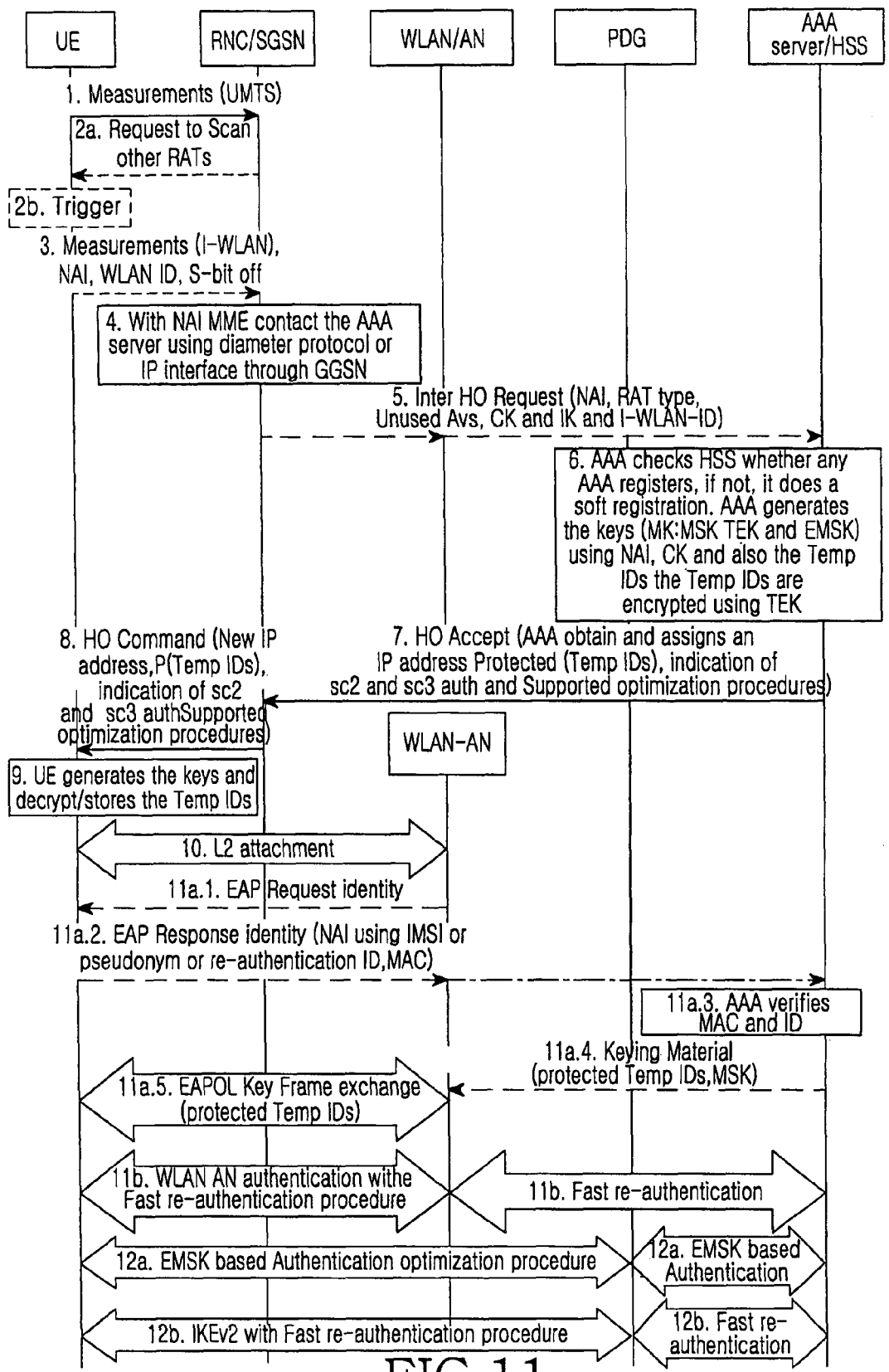
FIG. 11 illustrates the sequence of the message flow for Backward Handover from the UMTS to the I-WLAN access system (Scenario 2 and Scenario 3 access) according to the present invention.

Alternatively the UE initiates in step 11*b* the fast re-authentication procedure with the I-WLAN network. If the UE does not receive the fast re-authentication ID, then the UE sends the pseudonym ID to initiate a full authentication procedure. FIG. 11 illustrates a Backward Handover from the UMTS to the I-WLAN access system (Scenario 2 and Scenario 3 access) according to the present invention.

Referring to FIG. 11, a UE sends periodic or event based measurements to the UTRAN network in step 1.

If an RNC/SGSN finds that UE measurement is below the threshold or the SGSN decides in any manner that EUTRAN cannot be continued, then RNC/SGSN can request the UE to start scanning other RATs or the ENB/MME can request the UE to scan a particular RAT which would be a neighboring RAT or available in its coverage area. Alternatively, by L2 or by some other manner, the UE decides that the UTRAN cannot be continued and starts scanning the other RATs.

The UE sends the I-WLAN measurement report containing the I-WLAN ID and NAI with other parameters to the SGSN in step 3. Then the SGSN decides to handover the UE to the I-WLAN network.

Using NAI, the SGSN resolves in step 4 the I-WLAN AAA server IP address and contacts the AAA server through the logical interworking unit, which can be located within the SGSN or the AAA server, or a separate network entity or alternatively co-located within any network entity in the UMTS system or in the I-WLAN system. The functionality of the interworking unit is to convert the RAN and the CN containers/protocol/parameters of one access system to another.

The SGSN sends in step 5 the HO request to the AAA server through the interworking unit. The HO request contains the NAI, I-WLAN ID, Unused AVs, latest CK and IK and other parameters.

The AAA checks with the HSS in step 6 whether any AAA is registered with the HSS, and if not, the AAA performs a soft registration. The AAA generates/derives the keys (MSK, TEK and EMSK) using NAI, CK and IK. The AAA server also generates the Temp IDs (pseudonym ID and the fast re-authentication ID). The AAA server protects (encrypts) the Temp IDs using derived TEK and then sends them to the UE.

The AAA server sends the HO accept to the SGSN through the interworking unit in step 7 The HO accept message contains the protected temp IDs and the indication of whether scenario 2 and scenario 3 authentication is required. The AAA server also includes the supported optimization procedure for the UEs which consecutively perform scenario 2 and scenario 3 within the HO accept.

The SGSN forwards the received parameters in the HO accept message in the HO command message to the UE in step 8.

After receiving the HO command from the UMTS system to handover to the I-WLAN network, the UE generates the keys (MSK, TEK and EMSK) using the latest CK and IK and decrypts the protected Temp IDs in step 9.

The UE begins the L2 attachment with the I-WLAN AS in step 10.

The WLAN-AN initiates the authentication procedure in step 11*a*.1, if the I-WLAN system requires the authentication.

Then the UE sends the temp ID (fast re-authentication ID) in step 11*a*.2, if it is received in the HO command. The UE sends the EAP response identity with the temp ID (pseudonym ID or fast re-authentication ID) and with the integrity protection of the EAP response identity message to the AAA server through the I-WLAN AN.

If the AAA server receives EAP response identity message with temp ID, then the AAA knows that the UE has performed the HO preparation. The AAA server verifies in step 11*a*.3 the integrity protection and the temp ID. Thus, the AAA authenticates the UE. Optionally, the AAA Server can send the MAC protected message EAP Request/AKA Notification, previous to the EAP Success message, if the AAA server requested previously to use protected successful result indications. The AAA server generates the new temp IDs and sends them to the UE along with the EAP Request/AKA Notification message. The WLAN AN forwards the EAP Request/AKA Notification message to the UE. The UE sends the EAP Response/AKA-Notification. The WLAN AN forwards the EAP Response/AKA-Notification message to the AAA server, which ignores the contents of this message.

The AAA Server sends the EAP Success message to WLAN-AN in step 11*a*.4. If some extra keying material was generated for WLAN technology specific confidentiality and/or integrity protection, then the AAA Server includes this keying material in the underlying AAA protocol message (i.e. not at the EAP level). The I-WLAN AN stores the keying material to be used in communication with the authenticated WLAN-UE. If the AAA server does not use protected successful result indications, then the AAA server generates the new temp IDs and sends them to the UE along with the EAP success message.

The I-WLAN AN informs the WLAN-UE about the successful authentication with the EAP Success message in step 11*a*.5. At this time, the EAP AKA exchange has been successfully completed, and the WLAN-UE and the I-WLAN AN share keying material derived during that exchange.

Alternatively, in step 11*b* the UE initiates the fast re-authentication procedure with the I-WLAN network. If the UE does not receive the fast re-authentication ID, then the UE sends the pseudonym ID to initiate a full authentication procedure.

After a successful scenario 2 authentication procedure, the UE initiates the optimized authentication procedure for the scenario 3 listed by the AAA server in the HO command in step 12*a*. The UE may initiate the scenario 3 authentication procedure using the EMSK based optimization procedure.

Alternatively, in step 12*b* the UE may initiate the fast re-authentication procedure for scenario 3 authentication procedure.

Figure 12:
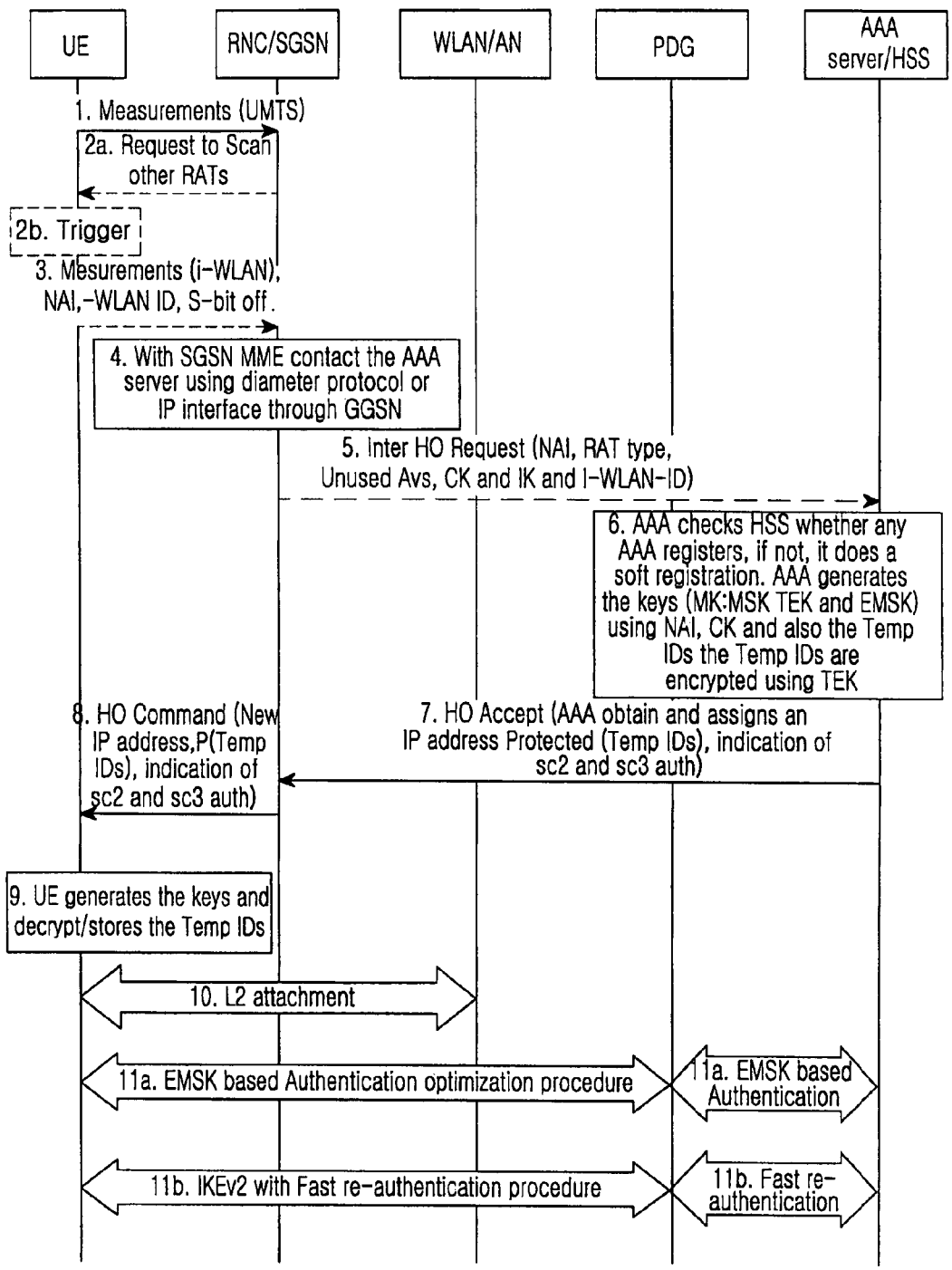
FIG. 12 illustrates the sequence of the message flow for Backward Handover from the UMTS to the I-WLAN access system (Scenario 3 access) according to the present invention.

FIG. 12 illustrates a backward Handover from the UMTS to the I-WLAN access system (Scenario 3 access) according to the present invention.

Referring to FIG. 12, a UE sends periodic or event based measurements to the UTRAN network in step 1.

If an RNC/SGSN finds that UE measurement is below the threshold or the SGSN decides by any other manner that EUTRAN cannot be continued, then in step 2 the RNC/SGSN can request the UE to start scanning other RATs or the ENB/MME can request the UE to scan a particular RAT which would be a neighboring RAT or available in its coverage area. Alternatively, by L2 or by another manner, the UE decides that the UTRAN cannot be continued and starts scanning the other RATs.

In step 3 the UE sends the I-WLAN measurement report containing the I-WLAN ID and NAI with other parameters to the SGSN. Then the SGSN decides to handover the UE to the I-WLAN network.

Using NAI, in step 4 the SGSN resolves the I-WLAN AAA server IP address and contacts the AAA server through the logical interworking unit, which can be located within the SGSN or within the AAA server or as a separate network entity or alternatively co-located within any network entity in the UMTS system or in the I-WLAN system. The functionality of the interworking unit is to convert the RAN and the CN containers/protocol/parameters of one access system to another.

The SGSN sends the HO request to the AAA server through the interworking unit in step 5. The HO request contains the NAI, I-WLAN ID, Unused AVs, latest CK and IK and other parameters.

In step 6 the AAA checks with the HSS whether any AAA is registered with the HSS, and if not, it performs a soft registration. The AAA generates/derives the keys (MSK, TEK and EMSK) using NAI, CK and IK. The AAA server also generates the Temp IDs (pseudonym ID and the fast re-authentication ID) and protects (encrypts) the Temp IDs using derived TEK and then send them to the UE.

The AAA server sends in step 7 the HO accept to the SGSN through the interworking unit. The HO accept message contains the protected temp IDs (pseudonym ID and the fast re-authentication ID) and the indication of whether scenario 2 and scenario 3 authentication is required. The AAA server also includes the supported optimization procedure for the UEs which perform scenario 2 and scenario 3 consecutively within the HO accept.

The SGSN forwards the received parameters in the HO accept message in the HO command message to the UE in step 8.

After receiving the HO command from the UMTS system to handover to the I-WLAN network, the UE generates the keys (MSK, TEK and EMSK) using the latest CK and IK and decrypts the protected Temp IDs (pseudonym ID and the fast re-authentication ID) in step 9.

The UE starts the L2 attachment with the I-WLAN AS in step 10.

After the successful attachment with the I-WLAN AN, the UE initiates the optimized authentication procedure for the scenario 3 listed by the AAA server in the HO command in step 11a. The UE may initiate the scenario 3 authentication procedure using the EMSK based optimization procedure.

Alternatively, the UE may initiate the fast re-authentication procedure for scenario 3 authentication procedure in step 11b.

Forward Handover from the SAE System to the I-WLAN AS:

During the authentication procedure, the UE can send the details of the previous access system, such that the core network can retrieve the security context and the buffered packets from the old access system. The details of the last access system can be sent within the EAPOL ID response messages.

During the scenario-2 authentication procedure, if the UE and the network derives the keys using the CK and IK, then the core network can generate a temporary ID and pass it to the UE. The UE can start a fast re-authentication procedure for scenario-3 access.

The UE can send the sequence number of the last successfully received packet to the I-WLAN network. I-WLAN network can forward the same to core network and then the core network can start forwarding the packets after the last successful received sequence number by the UE.

Backward Handover from the I-WLAN to the UMTS Access System:

The UE and Network can optionally use the latest CK and IK. The UE starts the RRC connection procedure and SMC procedure without AKA authentication.

Alternatively, SMC procedure can be performed during the HO preparation phase.

In HO command network can send the supported algorithm and the UE selects the algorithm and starts protecting the initial message.

Forward Handover from the I-WLAN to the UMTS Access System:

During the RAU procedure, the UE can send the details of the previous access system within the RAU message, and so that core network can retrieve the security context (CK and IK) and the buffered packets from the old access system.

Figure 13:
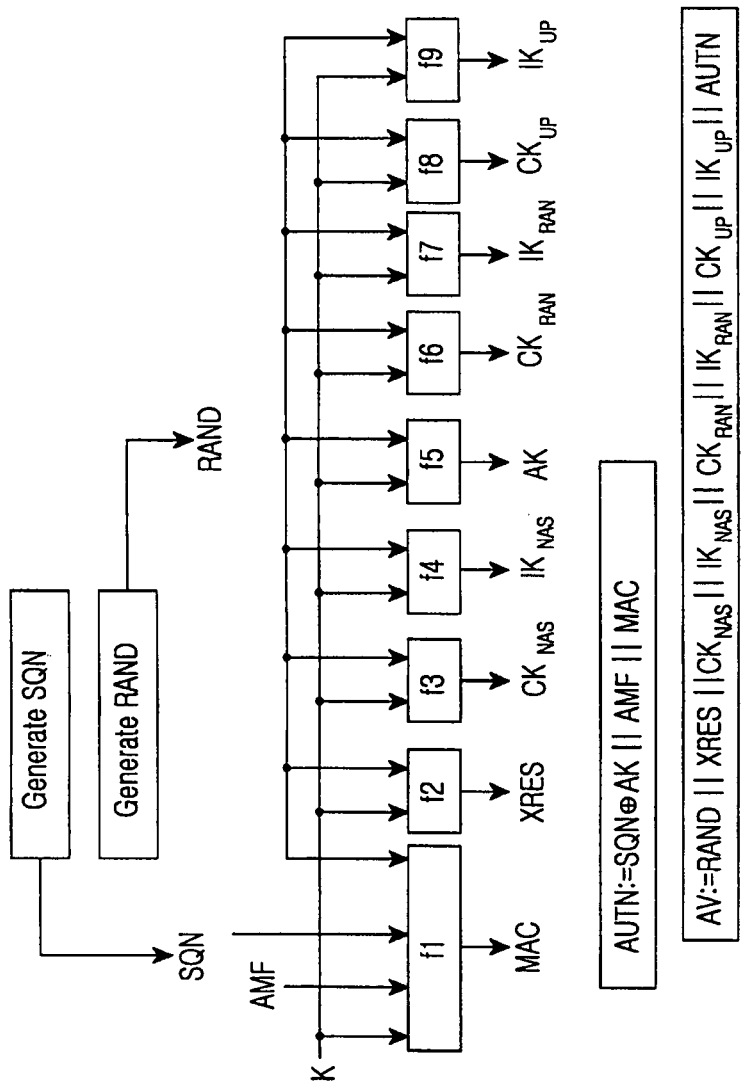
FIG. 13 illustrates the Key derivation for the evolved system (Alternative-1) according to the present invention.

KEY Derivation for SAE System—Alternative-1 as shown in the FIG. 13:

Nine AVs are derived in the UE and in the HSS as shown in the FIG. 13. Functions f6, f7, f8 and f9 are new key derivation functions for an LTE/SAE system. The HSS passes n numbers of 9 AVs to the MME, when the MME requests for the AVs, to authenticate and to secure the communication of the LTE/SAE capable UE.

Security context transfer from LTE/SAE to other RATs is expressed in following Equations (1) or (2):

$$CK = CK_{NAS} \text{ xor } CK_{UP} \text{ and } IK = IK_{NAS} \text{ xor } IK_{UP} \quad (1)$$

or $$CK = CK_{NAS} \text{ and } IK = IK_{NAS} \quad (2)$$

where CK indicates Cypher Key, IK indicates Integrity Key or a key in the AV from an HSS.

Security context transfer from other RATs to LTE/SAE is expressed in Equation (3):

$$CK_{NAS} \| IK_{NAS} \| CK_{UP} \| IK_{UP} \| CK_{RAN} \| IK_{RAN} = \text{prf} + (\text{Identity of UE} \| IK \| CK) \quad (3)$$

where CK indicates Cypher Key, IK indicates Integrity Key.

Above keys are derived at the UE and the MME.

If the MME and UPE are combined, then function F8 and F9 are not present and $CK_{NAS}$ and $IK_{NAS}$ are used for both NAS signal protection and user plane protection.

Security context transfer from LTE/SAE to other RATs is expressed in Equation (4):

$$CK = CK_{NAS} \text{ and } IK = IK_{NAS} \quad (4)$$

where CK and IK are previously identified.

Security context transfer from other RATs to LTE/SAE is expressed in Equation (5):

$$CK_{NAS} \| IK_{NAS} \| CK_{RAN} \| IK_{RAN} = \text{prf} + (\text{Identity of UE} \| IK \| CK) \quad (5)$$

where prf indicates pseudo random function, and CK, IK and UE are previously identified.

Figure 14:
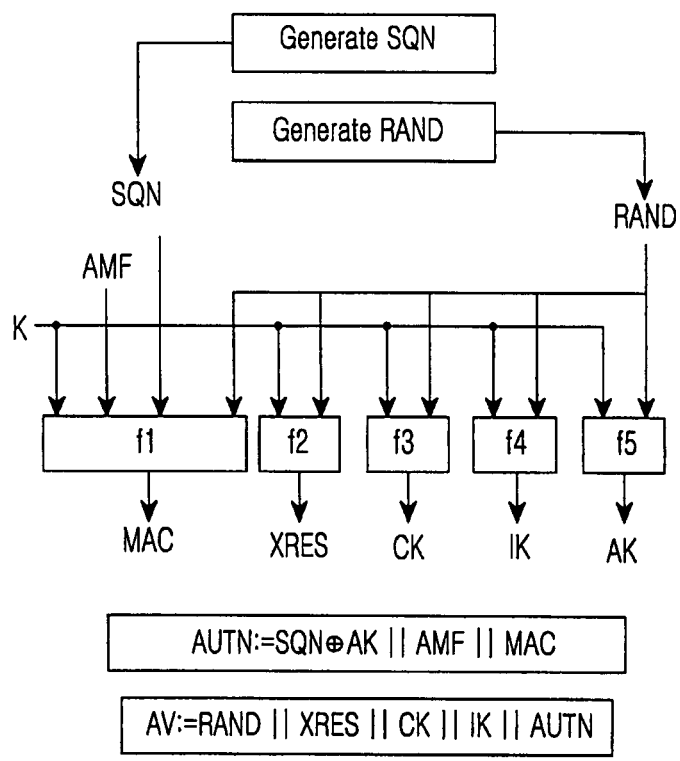
FIG. 14 illustrates the Key derivation for the evolved system (Alternative-1) according to the present invention.

KEY Derivation for SAE System—Alternative-2:

In this alternative, the LTE/SAE system uses the UMTS AVs as shown in FIG. 14 and derives the other keys as follows in Equation (6):

$$CK_{NAS}\|IK_{NAS}\|CK_{UP}\|IK_{UP}\|CK_{RAN}\|IK_{RAN} = \text{prf} + (\text{Identity of UE}\|IK\|CK) \quad (6)$$

There are common $CK_{NAS}$ and $IK_{NAS}$ for all MMEs, common $CK_{UP}$ and $IK_{UP}$ for all User Plane Entities (UPEs) and common $CK_{RAN}$ and $IK_{RAN}$ for all Evolving Node Bs (ENBs).

When the MME and UPE are combined, then function F8 and F9 are not present and $CK_{NAS}$ and $IK_{NAS}$ are used for both NAS signal protection and user plane protection as follows in Equation (7):

$$CK_{NAS}\|IK_{NAS}\|CK_{RAN}\|IK_{RAN} = \text{prf} + (\text{Identity of UE}\|IK\|CK) \quad (7)$$

where each of these parameters is previously identified.

Where Identity of a UE will be in NAI format, if EAP-AKA is used or will be IMSI or TMSI if UMTS-AKA based authentication is performed.

Identity of the UE may also concatenate with the serving node identity.

There are common $CK_{NAS}$ and $IK_{NAS}$ for all MMEs and common $CK_{RAN}$ and $IK_{RAN}$ for all ENBs within the same operator domain.

KEY Derivation for SAE System—Alternative-3:

In this alternative, the LTE/SAE system uses the UMTS AVs as shown in FIG. 14 and derives the other keys as follows in Equations (8)-(13):

$$CK_{NAS} = \text{prf}(CK, UE\_ID\|MME\_ID) \quad (8)$$

$$CK_{UP} = \text{prf}(CK, UE\_ID\|UPE\_ID) \quad (9)$$

$$CK_{RAN} = \text{prf}(CK, UE\_ID\|ENB\_ID) \quad (10)$$

$$IK_{NAS} = \text{prf}(IK, UE\_ID\|MME\_ID) \quad (11)$$

$$IK_{UP} = \text{prf}(IK, UE\_ID\|UPE\_ID) \quad (12)$$

$$IK_{RAN} = \text{prf}(IK, UE\_ID\|ENB\_ID) \quad (13)$$

In the above Equations, prf indicates pseudo random function, UE indicates User Equipment, ID indicates Identifier, MME indicates Mobility Management Entity.

Unique keys are derived for the network entities.

It will also be obvious to those skilled in the art that other control methods and apparatuses can be derived from the combinations of the various methods and apparatuses of the present invention as taught by the description and the accompanying drawings and these shall also be considered within the scope of the present invention. It should also be noted that the host for storing the applications includes but is not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart therefrom.

What is claimed is:

1. A method for optimizing an authentication procedure during inter access system handovers in a heterogeneous network, comprising the steps of:

deriving new keys for accessing a new system from most recent system access keys of an existing system;

enabling an authentication procedure during a User Equipment (UE) handover from the existing system to the new system by using the most recent system access keys of the existing system;

receiving, by the UE, a temporary identification (ID) that is encrypted;

decrypting, by the UE, the temporary ID using one of the derived new keys for accessing the new system; and accessing the new system during handover preparation and enabling the UE to perform a fast re-authentication in the new system by using the temporary ID, wherein the UE handover comprises a forward handover that includes sending, by the UE, details of the existing system, which is a previous access system, and retrieving, by the network, a Cypher Key (CK), an Integrity Key (IK), and buffered packets from the previous access system by using the details of the existing system;

wherein the UE handover comprises at least one of the following:

forward and backward handover between an Integrated Wireless Local Area Network access system (I-WLAN) and a System Architecture Evolution access system (SAE);

forward and backward handover between a Universal Mobile Telecommunication System (UMTS) and the SAE; and forward and backward handover between the I-WLAN and the UMTS; and wherein the backward handover from the SAE access system to the I-WLAN comprises checking a Home Subscription Server (HSS), by an Authentication, Authorization and Accounting (AAA) server, to determine whether any AAA is registered, and if not, performing, by the AAA server, a soft registration in which the AAA server generates a Master Session Key (MSK), a Transient Encryption Key (TEK), and an Extended MSK (EMSK) using a Network Access Identifier NAI), the CK and the IK, generates the temporary ID including a pseudonym ID and a fast re-authentication ID, protects the temporary ID using the TEK and sends it to the UE.

2. The method as claimed in claim 1, wherein the backward handover from the SAE access system to the I-WLAN comprises:

sending, by the UE, periodic or event based measurements to an Enhanced UMTS Terrestrial Radio Access Network (EUTRAN);

determining, by an Evolving Node B Mobility Management Entity (ENB/MME), that sent UE measurements are below a threshold or determining, by a Mobile Management Entity (MME), that the EUTRAN cannot be continued, requesting the UE, by the ENB/MME, to scan other Radio Access Technology (RAT) or a RAT that is available in a coverage area of the UE, or deciding, by the UE, that the EUTRAN cannot be continued and then scanning the other RAT;

sending, by the UE, an I-WLAN measurement report including an I-WLAN ID and the NAI with other parameters to the SAE and deciding, by the ENB/MME or by the ENB/MME and a logical interworking unit, to handover the UE to the I-WLAN;

using the NAI, by the MME, to resolve the AAA server IP address of the I-WLAN and contacting the AAA server through the logical interworking unit, wherein the logical interworking unit is located within one of the MME, the AAA server or a network entity in the SAE or in the I-WLAN;

sending, by the MME, a handover request to the AAA server through the interworking unit, wherein the handover request includes the NAI, I-WLAN ID, Unused Authentication Vectors (AVs), the CK, the IK and other parameters;

sending, by the AAA server, a handover accept message to the MME through the interworking unit where the handover accept message includes the protected temporary IDs and an indication of whether authentication is required;

forwarding, by the MME to the UE, a handover command message including the received parameters in the handover accept message;

generating, by the UE, the MSK, TEK and EMSK keys using the CK and IK and decrypting the protected temporary IDs after receiving the handover command from the SAE system to handover to the I-WLAN; and starting, by the UE, a Layer 2 (L2) attachment with the I-WLAN.

3. The method as claimed in claim 2, further comprising:
initiating by the I-WLAN the authentication procedure, if the I-WLAN system requires the authentication;

sending, by the UE, the fast re-authentication temporary ID, if the UE receives the handover command;

sending, by the UE, an Extensible Authentication Protocol (EAP) response identity message with one of the temporary pseudonym ID, temporary fast re-authentication ID, and integrity protection of the EAP response identity message, to the AAA server through the I-WLAN;

receiving, by the AAA server, an EAP response identity message with the temporary ID and verifying, by the AAA server, the integrity protection and the temporary ID, thereby AAA authenticating the UE;

sending, by the AAA server, an EAP Request/AKA Notification message, prior to sending an EAP Success message, if the AAA server previously requests to use protected successful result indications, wherein the EAP Request/AKA Notification message is Medium Access Control (MAC) protected and the AAA server generates and sends to the UE the new temporary IDs and the EAP Request/AKA Notification message;

forwarding, by the I-WLAN, the EAP Request/AKA Notification message to the UE, wherein the UE sends the EAP Response/AKA-Notification and the I-WLAN forwards the EAP Response/AKA-Notification message to the AAA server which AAA server does not consider the contents of the message;

sending, by the AAA server, the EAP Success message to the I-WLAN, and if additional keying material was generated for the I-WLAN storing, by the I-WLAN, the keying material to be used in communication with an authenticated WLAN-UE;

generating, by the AAA server, the new temporary IDs and sending the temporary IDs to the UE with the EAP success message, if the AAA server does not use protected successful result indications;

informing the WLAN-UE, by the I-WLAN, about the successful authentication with the EAP Success message wherein an EAP AKA exchange has been successfully completed, and the WLAN-UE and the I-WLAN share keying material derived during the EAP AKA exchange; and initiating, by the UE, the fast re-authentication procedure with the I-WLAN and sending, by the UE, the pseudonym ID to initiate a full authentication procedure, if the UE does not receive the fast re-authentication ID.

4. The method as claimed in claim 3, further comprising:
initiating, by the UE, an authentication procedure listed by the AAA server in the handover command after a successful authentication procedure, wherein the UE initiates the authentication procedure using an EMSK based optimization procedure; and wherein the UE alternatively initiates the fast re-authentication procedure for the authentication procedure.

5. The method as claimed in claim 3, further comprising:
initiating, by the UE, an authentication procedure listed by the AAA server in the handover command after a successful attachment with the I-WLAN, wherein the UE initiates the authentication procedure using an EMSK based optimization procedure;

wherein the UE alternatively initiates the fast re-authentication procedure for the optimized authentication procedure.

6. The method as claimed in claim 1, wherein, in the forward handover from the SAE system to the I-WLAN, the details of the previous access system are sent within Extensible Authentication Protocol Over LAN (EAPOL) ID response messages;

deriving, by the UE and the network, a plurality of keys using a CK and IK, during an authentication procedure, generating, by the network, a temporary ID and forwarding the temporary ID to the UE, wherein the UE begins a fast re-authentication procedure; and sending, by the UE, a sequence number of a most recent successfully received packet to the I-WLAN network, which I-WLAN network forwards to the network, and wherein the network begins forwarding the packet after the last successful received sequence number by the UE.

7. The method as claimed in claim 1, wherein the backward handover from the I-WLAN to the SAE comprises:
sending, by the UE, periodic or event based measurements to a logical decision and interworking unit that is separately located or is located within one of a Mobility Management Entity (MME), an AAA server, and any network entity in the SAE or in the I-WLAN;

requesting, by the logical decision and interworking unit, the UE to begin scanning other RATs, or requesting the UE, by an ENB/MME, to scan a particular RAT that is available in its coverage area, or determining, by the UE, that the I-WLAN cannot be continued and beginning scanning of the other RATs, if the logical decision and interworking unit finds that the UE measurement is below a threshold or that I-WLAN cannot be continued;

sending, by the UE, an SAE measurement report including a TAI, selected UMTS Integrity Algorithm (UTA) and UMTS Encryption Algorithm (UEA), Evolving Node B Identification (ENB-ID), and a START value to the logical decision and interworking unit through the AAA server;

determining, by the logical decision and interworking unit, to handover the UE to the SAE and notifying the AAA server of the determination;

contacting, by the AAA server, an HSS using the TAI, to learn an MME address;

sending, by the AAA server, a handover request message to an MME/User Plane Entity (UPE), wherein the handover request message includes at least a previous RAT type, unused AVs, a most recent CK and IK, and the ENB-ID;

checking the HSS, by the MME, to determine whether any AAA is registered with the HSS, and if not, performing by the MME a soft registration and generating the keys;

sending, by the MME, a handover accept message to the AAA server through the interworking unit, wherein the handover accept message includes the selected UEA and UIA, and a FRESH, and determining whether to start at least a Radio Access Network (RAN) protection;

forwarding, by the AAA server, received parameters in the handover accept message, to the UE in a handover command message;

deriving, by the UE, keys specific to the SAE using the a most recent CK and IK after receiving the handover command from the AAA server to handover to the SAE;

starting, by the UE, an L2 attachment with the ENB without any protection;

sending, by the UE, an initial Layer 3 (L3) message to the MME/UPE wherein the initial L3 message includes a user identity, the START value and MAC-$I_{NAS}$, wherein the MAC-$I_{NAS}$ is calculated using a derived SAE specific key, and FRESH and START values;

verifying, by the MME/UPE, the MAC-$I_{NAS}$ using the derived keys, the received START and FRESH values;

sending, by the MME/UPE, an Initial L3 message reply which includes the keys for the ENB, START, FRESH and the UEA and the UIA, and calculating, by the MME, the MAC-$I_{NAS}$ over the Initial L3 message reply excluding the keys for the ENB, START, optionally FRESH and the UEA and the UIA;

receiving, by the MME, the Initial L3 message reply and storing the keys for the START, FRESH and the UEA and UIA;

forwarding, by the ENB, the Initial L3 message reply to the UE and starting, by the ENB, RAN security (MAC-$I_{RAN}$); and verifying, by the UE, the MAC-$I_{NAS}$ and MAC-$I_{RAN}$.

8. The method as claimed in claim 1, wherein the backward handover from the I-WLAN to the SAE comprises:

sending, by the UE, periodic or event based measurements to a logical decision and interworking unit that is separately located or is located within one of an MME, an AAA server, and any network entity in the SAE or in the I-WLAN;

requesting, by the logical decision and interworking unit, the UE to begin scanning other RATs, or requesting the UE, by an ENB/MME, to scan a particular RAT that is available in its coverage area, or determining, by the UE, that the I-WLAN cannot be continued and beginning scanning of the other RATs, if the logical decision and interworking unit finds that the UE measurement is below a threshold or that I-WLAN cannot be continued;

sending, by the UE, an SAE measurement report including a TAI, selected UTA and UEA, Evolving Node B Identification (ENB-ID) and START value to the logical decision and interworking unit through the AAA server;

determining, by the logical decision and interworking unit, to handover the UE to the SAE and notifying the AAA server of the determination;

contacting, by the AAA server, an HSS using the TAI, to learn an MME address;

sending, by the AAA server, a handover request message to an MME/User Plane Entity (UPE), wherein the handover request message includes at least a previous RAT type, unused AVs, a most recent CK and IK, and the ENB-ID;

checking the HSS, by the MME, to determine whether any AAA is registered with the HSS, and if not, performing by the MME a soft registration and generating the keys using the CK and IK sent by the AAA server;

generating, by the MME, a FRESH and distributing a security context to the ENB, using the ENB-ID;

sending, by the MME, a handover accept message to the AAA server through the interworking unit, wherein the handover accept message includes the selected UEA and UTA, and FRESH and an indication to start RAN protection;

forwarding, by the AAA server, received parameters in the handover accept message, in a handover command message to the UE;

determining, by the UE, keys specific to the SAE using the a most recent CK and IK and beginning the RAN protection after receiving the handover command from the AAA server to handover the UE to the SAE;

beginning, by the UE, the L2 attachment with the ENB and protecting Radio Resource Control (RRC) messages, wherein during an initial message to the ENB, the UE passes the START value and calculates MAC-$I_{RAN}$ using the derived SAE specific key, FRESH and START values and the ENB verifying the MAC-$I_{RAN}$;

sending, by the UE, an initial L3 message to the MME/UPE where the initial L3 message includes a user identity, START value and the MAC-$I_{NAS}$, wherein the MAC-$I_{NAS}$ is calculated using the derived SAE specific key, and FRESH and START values;

verifying, by the MME/UPE the MAC-I using the derived keys, the received START value and FRESH value; and sending, by the MME/UPE, an Initial L3 message reply, wherein the MME calculates the MAC-$I_{NAS}$ over the Initial L3 message reply.

9. The method as claimed in claim 1, wherein, in the forward handover from the I-WLAN to the SAE system, the details of the previous access system are sent within a TAU procedure, and a CK, an IK and the buffered packets are retrieved from the previous access system during the TAU procedure or an initial NAS message.

10. The method as claimed in claim 1, wherein the backward handover from the UMTS to the SAE comprises:

sending, by the UE, periodic or event based measurements to a Serving GPRS Support Node (SGSN) in a report;

requesting, by the SGSN, based on the measurement report, the UE to begin scanning other RATs or alternatively requesting the UE, by an ENB/MME, to scan other RATs or a RAT that is available in a coverage area of the UE, or deciding, by the UE, that an EUTRAN cannot be continued and then scanning the other RATs;

sending, by the UE, an SAE measurement report including the TAI, selected UTA and UEA and a START value and ENB ID to the SGSN;

determining, by the SGSN, to handover the UE to the SAE, where the SGSN uses the TAI to determine an MME address, and contacts an MME using one of at least an S3 or S4 interface or contacting an HSS;

sending, by the SGSN, a handover request message to an MME/UPE, wherein the handover request message includes at least a security context, a previous RAT type, Unused AVs, most recent CK and IK, ENB-ID, START value, and KSI;

checking the HSS, by the MME, to determine whether any MME is registered with the HSS, and if not, performing by the MME a soft registration and generating the keys using the CK and IK sent by the SGSN, and converting, by the MME, UMTS parameters to SAE specific parameters by using a logical interworking unit which is located within one of the MME, an AAA server or any network entity in the SAE or in the I-WLAN;

generating FRESH by the MME and using the ENB-ID to distribute, to an ENB, the security context which includes ENB keys for at least RAN protection, selected UIA and UEA, FRESH, START, and KSI;

sending, by the MME, a handover accept message to the SGSN, which handover accept message includes the UEA, UIA and FRESH;

forwarding, by the SGSN, the received parameters in the handover accept message, in a handover command message to the UE;

determining, by the UE, keys specific to the SAE system using the most recent CK and IK and starting the RAN protection after receiving the handover command message from the SGSN to handover the UE to the SAE network;

beginning, by the UE, an L2 attachment with the ENB and protecting RRC messages, wherein during an initial message to the ENB, the UE passes the START value and calculates MAC-$I_{RAN}$ using the derived SAE specific key, FRESH and START value and the ENB verifying the MAC-$I_{RAN}$ using a security context received along with the START value;

sending, by the UE, an initial L3 message to the MME/UPE, wherein the initial L3 message includes a user identity, START value, KSI and MAC-$I_{NAS}$, wherein the MAC-$I_{NAS}$ is calculated using the derived SAE specific key, FRESH and START values;

verifying, by the MME/UPE, the MAC-$I_{NAS}$ using the derived keys, the received START and FRESH values; and sending, by the MME/UPE, an Initial L3 message reply and calculating, by the MME, the MAC-$I_{NAS}$ over the Initial L3 message reply.

11. The method as claimed in claim 1, wherein, in the forward handover from the UMTS to the SAE system, a CK, an IK and the buffered packets are retrieved from the previous access system during a TAU procedure or an initial NAS message.

12. The method as claimed in claim 1, wherein the backward handover from the SAE to the UMTS comprises:

sending, by the UE, periodic or event based measurements to an ENB/MME in a report;

using the report, by the ENB/MME, to request the UE to begin scanning other RATs or a RAT that is available in a coverage area of the UE, or deciding, by the UE, that an EUTRAN cannot be continued and then scanning the other RATs;

sending, by the UE, a UMTS measurement report including an RAI, supported UIA and UEA, KSI and START values and a cell ID to the ENB/MME;

determining, by an SGSN, to handover the UE to the UMTS whereby using RAI, an MME knows an address of the SGSN and contacts the SGSN using one of an S3 or S4 interface or by contacting an HSS;

sending, by the MME, a handover request message to the SGSN wherein the handover request message includes a security context, a Previous RAT type, Unused AVs, a most recent CK and IK, a cell-ID, a START value, KSI and other parameters and the MME converts the SAE parameters to UMTS specific parameters by using a logical interworking unit which is separately located or is located within one of the MME, the SGSN any network entity in the SAE system or in the UMTS system;

checking the HSS, by the SGSN, to determine whether any SGSN is registered in the HSS, and if not, performing by the SGSN a soft registration;

generating, by the SGSN, a FRESH and distributing a security context which includes at least keys for protection, selected UIA and UEA, FRESH, START and KSI to an RNC, using the cell-ID, wherein the RNC stores the received parameters;

sending, by the SGSN, a handover accept message to the MME, wherein the handover accept message includes the UEA, UIA, and FRESH;

forwarding, by the MME, received parameters in the handover accept message, in a handover command message to the UE;

using, by the UE, the most recent CK and IK for the UMTS and beginning RAN protection after receiving the handover command from the MME to handover to the UMTS network;

beginning, by the UE, an L2 attachment with the RNC wherein the UE begins protecting RRC messages and passes the START value during an initial message to the RNC;

sending, by the UE to the SGSN, an initial L3 message including user identity, the START value, the KSI and the MAC-I; and verifying, by the RNC, the MAC-I and forwarding the MAC-I to the SGSN.

13. The method as claimed in claim 1, wherein, in the forward handover from the SAE to the UMTS system, a CK, an IK and the buffered packets are retrieved from the previous access system during a RAU procedure or a first NAS message.

14. The method as claimed in claim 1, wherein backward handover from the UMTS to the I-WLAN comprises:

sending, by the UE, periodic or event based measurements to an EUTRAN;

determining, by a Radio Network Controller/Serving GPRS Support Node (RNC/SGSN), that sent UE measurements are below a threshold or determining, by an SGSN, that the EUTRAN cannot be continued;

requesting the UE, by an ENB/MME, to scan other RATs or a RAT that is available in a coverage area of the UE, or deciding, by the UE, that the EUTRAN cannot be continued and then scanning the other RATs;

sending, by the UE, an I-WLAN measurement report including an I-WLAN ID and an NAI with other parameters to the SGSN and deciding, by the SGSN, to handover the UE to the I-WLAN;

using the NAI, by the SGSN, to resolve an AAA server IP address of the I-WLAN and contacting an AAA server through a logical interworking unit, wherein the logical interworking unit is located within one of the SGSN, the AAA server or a network entity in the UMTS or in the I-WLAN;

sending, by the SGSN, a handover request to the AAA server through the interworking unit, wherein the handover request includes the NAI, I-WLAN ID, Unused AVs, a latest CK and IK and other parameters;

checking an HSS, by the AAA server, to determine whether any AAA is registered, and if not, performing, by the AAA server, a soft registration in which the AAA server generates MSK, TEK and EMSK keys using NAI, CK and IK, generates temporary IDs including a pseudonym ID and a fast re-authentication ID, protects the temporary IDs using the TEK and sends it to the UE;

sending, by the AAA server, a handover accept message to the SGSN through the interworking unit where the handover accept message includes the protected temporary IDs and an indication of whether authentication is required;

forwarding, by the SGSN to the UE, a handover command message including the received parameters in the handover accept message;

generating, by the UE, the MSK, TEK and EMSK keys using the CK and IK and decrypting the protected temporary IDs after receiving the handover command from the UMTS to handover to the I-WLAN; and starting, by the UE, an L2 attachment with the I-WLAN.

15. The method as claimed in claim 14, further comprising:

initiating by the I-WLAN an authentication procedure, if the I-WLAN system requires authentication;

sending, by the UE, the fast re-authentication temporary ID, if the UE receives the handover command;

sending, by the UE, an EAP response identity message with one of the temporary pseudonym ID, temporary fast re-authentication ID, and integrity protection of the EAP response identity message, to the AAA server through the I-WLAN;

verifying, by the AAA server, the integrity protection and the temporary ID if the AAA server receives an EAP response identity message with the temporary ID;

authenticating the UE, by the AAA server;

sending, by the AAA server, an EAP Request/AKA Notification message, prior to sending an EAP Success message, if the AAA server previously requests to use protected successful result indications, wherein the EAP Request/AKA Notification message is MAC protected;

generating and sending to the UE, by the AAA server, the new temporary IDs and the EAP Request/AKA Notification message;

forwarding, by the I-WLAN, the EAP Request/AKA Notification message to the UE, wherein the UE sends the EAP Response/AKA-Notification and the I-WLAN forwards the EAP Response/AKA-Notification message to the AAA server which AAA server does not consider the contents of the message;

sending, by the AAA server, the EAP Success message to the I-WLAN, and if additional keying material is generated for I-WLAN specific confidentiality and integrity protection, including, by the AAA server, the keying material in an underlying AAA protocol message and storing, by the I-WLAN, the keying material to be used in communication with an authenticated WLAN-UE;

generating, by the AAA server, the new temporary IDs and sending the temporary IDs to the UE with the EAP success message, if the AAA server does not use protected successful result indications;

informing the WLAN-UE, by the I-WLAN, about the successful authentication with the EAP Success message wherein an EAP AKA exchange has been successfully completed, and the WLAN-UE and the I-WLAN share keying material derived during the EAP AKA exchange; and initiating, by the UE, the fast re-authentication procedure with the I-WLAN and sending, by the UE, the pseudonym ID to initiate a full authentication procedure, if the UE does not receive the fast re-authentication ID.

16. The method as claimed in claim 15, further comprising:

initiating, by the UE, an authentication procedure listed by the AAA server in the handover command after a successful authentication procedure wherein the UE initiates the authentication procedure using an EMSK based optimization procedure; and alternatively initiating, by the UE, the fast re-authentication procedure for the authentication procedure.

17. The method as claimed in claim 14, wherein the AAA server includes a supported optimization procedure for the UEs which consecutively perform handover procedures within a handover accept message.

18. The method as claimed in claim 14, further comprising:

initiating, by the UE, an authentication procedure for a scenario listed by the AAA server in the handover command after a successful attachment with the 1-WLAN AN and initiating, by the UE, the authentication procedure using EMSK based optimization procedure; and alternatively initiating, by the UE, the fast re-authentication procedure for the authentication procedure.

19. The method as claimed in claim 1, wherein backward handover from the I-WLAN to the UMTS access system further comprises:

using, by the UE and the network, a most recent CK and IK, wherein the UE begins an RRC connection procedure and an SMC procedure without AKA authentication;

alternatively performing the SMC procedure during a handover preparation phase; and sending, by the network, a supported algorithm and selecting by the UE the algorithm and beginning protection of an initial message.

20. The method as claimed in claim 1, wherein, in the forward handover from the I-WLAN to the UMTS access system, the security context and the buffered packets are retrieved from the previous access system during an RAU procedure.

21. A system for optimizing an authentication procedure during inter access system handovers in heterogeneous networks, comprising:

means for deriving new keys for accessing a new system from most recent system access keys of an existing system;

means for enabling an authentication procedure during a User Equipment (UE) handover from an existing system to the new system by using the most recent system access keys of the existing system;

means for receiving, by the UE, a temporary identification (ID) that is encrypted;

means for decrypting, by the UE, the temporary ID using one of the derived new keys for accessing the new system; and means for accessing the new system during handover preparation, which enables the UE to perform a fast re-authentication in the new system by using the temporary ID, wherein the UE handover comprises a forward handover that includes sending, by the UE, details of the existing system, which is a previous access system, and retrieving, by the network, a Cypher Key (CK), an Integrity Key (IK), and buffered packets from the previous access system by using the details of the existing system;

wherein the UE handover comprises at least one of the following:

forward and backward handover between an Integrated Wireless Local Area Network access system (I-WLAN) and a System Architecture Evolution access system (SAE);

forward and backward handover between a Universal Mobile Telecommunication System (UMTS) and the SAE; and forward and backward handover between the I-WLAN and the UMTS; and wherein the backward handover from the SAE access system to the I-WLAN comprises checking a Home Subscription Server (HSS), by an Authentication, Authorization and Accounting (AAA) server, to determine whether any AAA is registered, and if not, performing, by the AAA server, a soft registration in which the AAA server generates a Master Session Key (MSK), a Transient Encryption Key (TEK), and an Extended MSK (EMSK) using a Network Access Identifier (NAI), the CK and the IK, generates the temporary ID including a pseudonym ID and a fast re-authentication ID, protects the temporary ID using the TEK and sends it to the UE.

\* \* \* \* \*